(12) United States Patent
Hirokane et al.

(10) Patent No.: US 6,278,668 B1
(45) Date of Patent: Aug. 21, 2001

(54) MAGNETO-OPTICAL STORAGE MEDIA

(75) Inventors: Junji Hirokane, Nara; Noboru Iwata, Tenri; Akira Takahashi, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/442,794

(22) Filed: Nov. 18, 1999

(30) Foreign Application Priority Data

Nov. 20, 1998 (JP) .................................................. 10-331547

(51) Int. Cl.$^7$ ....................................................... G11B 11/00
(52) U.S. Cl. .................... 369/13; 428/64.3; 428/694 ML
(58) Field of Search ......................... 369/13, 14, 110.01, 369/112.01, 112.16, 116; 360/59, 114; 428/64.3, 694 ML

(56) References Cited

U.S. PATENT DOCUMENTS

| | | | |
|---|---|---|---|
| 5,175,714 | * 12/1992 | Kikitsu et al. | 369/13 |
| 5,412,627 | * 5/1995 | Ichihara et al. | 369/13 |
| 5,659,537 | * 8/1997 | Hirokane et al. | 369/275.2 |
| 5,825,723 | * 10/1998 | Hirokane et al. | 369/13 |
| 5,939,187 | * 8/1999 | Hirokane et al. | 369/13 |
| 6,117,544 | * 9/2000 | Hirokane et al. | 428/336 |
| 6,147,939 | * 11/2000 | Takahashi et al. | 369/13 |

OTHER PUBLICATIONS

"Magnetic Domain Expansion Readout with DC Laser and DC Magnetic Field (MAMMOS)," A. Yamaguchi, et al. Lecture Resume for Spring, 1997, 44$^{th}$ Conference, The Society of Applied Physics Researchers, p. 1068, 30a–NF–3.

* cited by examiner

Primary Examiner—Tan Dinh
(74) Attorney, Agent, or Firm—Dike, Bronstein, Roberts & Cushman; David G. Conlin

(57) ABSTRACT

A magneto-optical storage medium includes:

- a reproduction layer exhibiting an in-plane magnetization state at room temperature and changing to a perpendicular magnetization state at a transition temperature Tp1;
- a supplementary reproduction layer exhibiting an in-plane magnetization state at room temperature and changing to a perpendicular magnetization state at a transition temperature Tp2;
- a non-magnetic intermediate layer; and
- a storage layer made of a perpendicular magnetization film, the layers being deposited in this order, the magneto-optical storage medium being arranged so as to satisfy:

Tp1<Tp2

This arrangement enables the magneto-optical storage medium to amplify the magnetic information stored in the storage layer and duplicate it to the reproduction layer, and signals whose cycle is equal to, or below, diffraction limits of light to be reproduced from the storage layer without reducing the amplitude.

21 Claims, 16 Drawing Sheets

↑ DIRECTION OF TM MOMENT  ⇧ LEAKING MAGNETIC FLUX

↑ DIRECTION OF TM MOMENT    ⇧ LEAKING MAGNETIC FLUX

↑ DIRECTION OF TM MOMENT ⇧ LEAKING MAGNETIC FLUX

↑ DIRECTION OF TM MOMENT  ⇧ LEAKING MAGNETIC FLUX

↑ DIRECTION OF TM MOMENT

MAGNETO-OPTICAL STORAGE MEDIA

FIELD OF THE INVENTION

The present invention relates to magneto-optical storage media, such as magneto-optical disks, magneto-optical tapes, and magneto-optical cards, that are used with magneto-optical storage and reproduction devices.

BACKGROUND OF THE INVENTION

Conventionally, magneto-optical storage media have been commercially manufactured as rewritable optical storage media. A drawback of the magneto-optical storage medium is that its reproduction properties deteriorate with a decrease in the size of the recording bit (magnetic recording domain) and in the interval between adjacent recording bits, relative to the size of a light beam that is emitted from a semiconductor laser device and then converged on the magneto-optical storage medium.

This is because the light beam converged on the targeted recording bit encompasses adjacent recording bits within its coverage and fails to separately reproduce the individual recording bits.

To overcome the drawback, various magnetic super high resolution reproduction technologies have been developed using a magnetic multi-layer film. These magnetic super high resolution reproduction technologies reduces interference between plus and minus signals during reproduction by forming a magnetic masking area and thus forming a magnetic aperture that is smaller than the beam spot, and enables reproduction of signals whose cycles do not exceed diffraction limits of light.

Nevertheless, the magnetic super high resolution reproduction technologies have a problem that the strength of reproduced signals decreases with a decrease in the recording cycle for the magnetic recording domain, because the aperture also needs to be reduced in size.

To solve the problem, a method is suggested to enable magnetic domain expansion reproduction without applying a.c. external magnetic fields (Magnetic Domain Expansion Readout with DC laser and DC magnetic field [Magnetic Amplifying Magneto-Optical System, or MAMMOS]), an article from resumes for lectures in 44th Conference organized in spring 1997 by the Society of Applied Physics Researchers, 30a-NF-3, page 1068).

Now, referring to FIG. 28 through FIG. 30, a magneto-optical storage medium based on the method will be explained. FIGS. 28 and 29 are plan and cross-sectional views schematically illustrating magnetization of the magneto-optical storage medium during reproduction. FIG. 30 is a cross-sectional view showing the medium arrangement of a magneto-optical disk that is an application of the magneto-optical storage medium.

As shown in FIG. 29, the magneto-optical storage medium is arranged from stacked layers including a reproduction layer 201, a supplementary reproduction layer 202, and a storage layer 204. The reproduction layer 201 and the supplementary reproduction layer 202 exhibit an in-plane magnetization state at room temperature, and changes to a perpendicular magnetization state as temperature is elevated by projection of a converged light beam 205 (light beam spot 205' in FIG. 28). The storage layer 204 is made of a perpendicular magnetization film, where magnetic information is stored as magnetization directions in magnetic domains 206 and 207.

The reproduction layer 201 is specified to change to a perpendicular magnetization state at a temperature lower than the temperature at which the supplementary reproduction layer 202 changes to a perpendicular magnetization state. Consequently, on heating using the light beam 205, the magnetic domain 209 where the reproduction layer 201 has changed to a perpendicular magnetization state grows larger than the magnetic domain 208 where the supplementary reproduction layer 202 changes to a perpendicular magnetization state.

The magnetization direction in the magnetic domain 208, where the supplementary reproduction layer 202 changes to a perpendicular magnetization state due to the heating with the light beam 205, is determined by coupling with the storage layer 204 through exchange forces. Hence, the magnetic information in the magnetic domain 206 in the storage layer 204 is duplicated to the supplementary reproduction layer 202 so that the direction of the auxiliary grating moment of the supplementary reproduction layer 202 conforms to that of the storage layer 204.

Next, the magnetic information in the magnetic domain 208, where the supplementary reproduction layer 202 has changed to a perpendicular magnetization state, is duplicated to the reproduction layer 201 so that the direction of the transition metal (TM) moment of the reproduction layer 201 conforms to that of the supplementary reproduction layer 202. Here, since the magnetic domain 209, where the reproduction layer 201 changes to a perpendicular magnetization state, grows larger than the magnetic domain 208, where the supplementary reproduction layer 202 changes to a perpendicular magnetization state, the magnetization state of the supplementary reproduction layer 202, i.e., the magnetization state of the storage layer 204, is amplified and duplicated to the reproduction layer 201.

As described above, in the magneto-optical storage medium in accordance to the aforementioned method, the magnetic information in the storage layer 204 is amplified and duplicated to the reproduction layer 201; therefore magnetic recording domains with a reduced recording cycle still allows reproduction of strong signals.

It should be noted that as shown in FIG. 30 the magneto-optical storage medium, having the arrangement shown in FIG. 29, constitutes a magneto-optical disk when stacked together with a substrate 210, a transparent dielectric protective layer 211, and a protective layer 212.

However, since the storage layer 204, the supplementary reproduction layer 202, and the reproduction layer 201 are coupled together through exchange forces, the transition from an in-plane magnetization state to a perpendicular magnetization state of the supplementary reproduction layer 202 and the reproduction layer 201 proceeds gradually with rising temperature; therefore the magneto-optical storage medium used for magnetic domain expansion reproduction in accordance with the method still has a problem that reproduction resolution is difficult to improve.

Further, the supplementary reproduction layer 202 and the reproduction layer 201 need to be thick so that the transition from an in-plane magnetization state to a perpendicular magnetization state of the supplementary reproduction layer 202 and the reproduction layer 201 takes place with rising temperature in a stable manner; however, greater thicknesses of the layers degrade playback sensitivity, which is yet another problem.

SUMMARY OF THE INVENTION

The present invention has an object to offer a magneto-optical storage medium, having satisfactory playback sensitivity, that can reproduce signals whose cycles do not exceed diffraction limits of light without reducing the amplitude of the reproduced signals.

In order to achieve the above object, the magneto-optical storage medium in accordance with the present invention includes:

a reproduction layer exhibiting an in-plane magnetization state at room temperature and changing to a perpendicular magnetization state at a transition temperature Tp1;

a supplementary reproduction layer exhibiting an in-plane magnetization state at room temperature and changing to a perpendicular magnetization state at a transition temperature Tp2;

a non-magnetic intermediate layer for breaking exchange coupling between a storage layer and the supplementary reproduction layer; and the storage layer made of a perpendicular magnetization film generating a leakage magnetic flux at temperatures around the transition temperature Tp2, the layers being deposited in this order, wherein Tp1<Tp2

According to the arrangement, the reproduction layer and the supplementary reproduction layer are specified so as to have such magnetic properties that the layers exhibit an in-plane magnetization state at room temperature and change to a perpendicular magnetization state with rising temperature. Also, the storage layer is specified so as to have such a composition to generate a great leakage magnetic flux around the elevated temperature at which the supplementary reproduction layer changes to a perpendicular magnetization state.

Consequently, upon heating the magneto-optical storage medium at a magnetic recording domain and its surrounding area, the magnetic recording domain storing information to be reproduced, the heated storage layer generates a leakage magnetic flux. The leakage magnetic flux arising from the magnetic recording domain in the storage layer is magnetostatically coupled with the total magnetization of the supplementary reproduction layer, and thereby causes the magnetic information in the magnetic recording domain in the storage layer to be duplicated to an area, of the supplementary reproduction layer, that has been heated and changed to a perpendicular magnetization state. Here, the magnetostatic coupling between the storage layer and the supplementary reproduction layer is maintained in a stable manner by the non-magnetic intermediate layer, formed between the storage layer and the supplementary reproduction layer, that completely breaks exchange coupling between the storage layer and the supplementary reproduction layer.

In addition, the transition temperature Tp1 at which the reproduction layer changes to a perpendicular magnetization state is specified lower than the transition temperature Tp2 at which the supplementary reproduction layer changes to a perpendicular magnetization state; therefore the magnetic domain formed in the supplementary reproduction layer through duplication is expanded and duplicated to an area, of the reproduction layer, that has been heated and changed to a perpendicular magnetization state by the exchange coupling.

Hence, by the specification that the transition temperature Tp1 at which the reproduction layer changes to a perpendicular magnetization state is lower than the transition temperature Tp2 at which the supplementary reproduction layer changes to a perpendicular magnetization state, the magnetic information in the storage layer can be amplified and duplicated to the reproduction layer via the supplementary reproduction layer.

In other words, the magnetization state of the magnetic recording domain to be reproduced is duplicated to the supplementary reproduction layer through heating, allowing only the expanded duplicate magnetic domain in the reproduction layer to be reproduced. Since the magnetic information stored in the magnetic recording domain in the storage layer is not directly reproduced, only the magnetic recording domain to be reproduced can be expanded and reproduced without interference from adjacent magnetic recording domains.

In addition, in the magneto-optic storage medium, the supplementary reproduction layer and the storage layer are coupled firmly with each other through magnetostatic forces, allowing the magnetic information in the storage layer to be accurately duplicated to the supplementary reproduction layer. In other words, the coupling between the storage layer and the reproduction layer and between the storage layer and the supplementary reproduction layer, since being established through magnetostatic forces, causes the reproduction layer and the supplementary reproduction layer to abruptly change from an in-plane magnetization state to a perpendicular magnetization state, and high reproduction resolution to be obtained.

In this manner, even when signals whose cycle is equal to, or below, diffraction limits of light are recorded in the storage layer, the magneto-optical storage medium can reproduce the signals without reducing the amplitude.

In order to achieve the above object, the magneto-optical storage medium in accordance with the present invention includes:

a reproduction layer exhibiting an in-plane magnetization state at room temperature and changing to a perpendicular magnetization state at a transition temperature Tp1;

a supplementary reproduction layer exhibiting an in-plane magnetization state at room temperature and changing to a perpendicular magnetization state at a transition temperature Tp2;

an in-plane magnetization layer made of an in-plane magnetization film having a Curie temperature Tc; and a storage layer made of a perpendicular magnetization film generating a leakage magnetic flux at temperatures around the transition temperature Tp2, the layers being deposited in this order, wherein Tp1<Tp2

Tc≦Tp2

According to the arrangement, the reproduction layer and the supplementary reproduction layer are specified so as to have such magnetic properties that the layers exhibit an in-plane magnetization state at room temperature and change to a perpendicular magnetization state with rising temperature. Also, the storage layer is specified so as to have such a composition to generate a great leakage magnetic flux around the elevated temperature at which the supplementary reproduction layer changes to a perpendicular magnetization state. Further, the in-plane magnetization layer is specified to have a relatively low Curie temperature.

Consequently, upon heating the magneto-optical storage medium at a magnetic recording domain and its surrounding area, the magnetic recording domain storing information to be reproduced, the heated magnetic recording domain generates a leakage magnetic flux. The leakage magnetic flux arising from the magnetic recording domain in the storage layer is magnetostatically coupled with the total magnetization of the supplementary reproduction layer via an area, of the in-plane magnetization layer, that has been heated beyond the Curie temperature and lost magnetization, and thereby causes the magnetic information in the magnetic recording domain in the storage layer to be duplicated to an area, of the supplementary reproduction layer, that has been heated and changed to a perpendicular magnetization state.

Here, the in-plane magnetization film formed between the storage layer and the supplementary reproduction layer in such a manner that its Curie temperature Tc approximates the transition temperature Tp2 at which the supplementary reproduction layer changes from an in-plane magnetization state to a perpendicular magnetization state (Tc≦Tp2) restrains the leakage magnetic flux arising from the storage layer at and below the Curie temperature Tc. The formation of the in-plane magnetization film therefore stabilizes the in-plane magnetization state of the supplementary reproduction layer at and below the transition temperature Tp2, and establishes firm magnetostatic coupling between the storage layer and the supplementary reproduction layer only in an area where temperature is elevated up to or beyond the transition temperature Tp2. The supplementary reproduction layer thereby has an improved reproduction resolution.

In addition, the transition temperature Tp1 at which the reproduction layer changes to a perpendicular magnetization state is specified lower than the transition temperature Tp2 at which the supplementary reproduction layer changes to a perpendicular magnetization state; therefore the magnetic domain formed in the supplementary reproduction layer through duplication is expanded and duplicated to an area, of the reproduction layer, that has been heated and changed to a perpendicular magnetization state by exchange coupling.

Hence, by such a specification that the transition temperature Tp1 at which the reproduction layer changes to a perpendicular magnetization state is lower than the transition temperature Tp2 at which the supplementary reproduction layer changes to a perpendicular magnetization state, the magnetic information stored in the storage layer can be amplified and duplicated to the reproduction layer via the supplementary reproduction layer.

In other words, the magnetization state of the magnetic recording domain to be reproduced is duplicated to the supplementary reproduction layer as a result of heating, allowing only the magnetic domain formed in the reproduction layer through the expansion and duplication to be reproduced. Since the magnetic information stored in the magnetic recording domain in the storage layer is not directly reproduced, only the magnetic recording domain to be reproduced can be expanded and reproduced without interference from adjacent magnetic recording domains.

In addition, in the magneto-optical storage medium, the supplementary reproduction layer and the storage layer are coupled firmly with each other through magnetostatic forces, allowing the magnetic information in the storage layer to be accurately duplicated to the supplementary reproduction layer. In other words, the coupling between the storage layer and the reproduction layer and between the storage layer and the supplementary reproduction layer, since being established through magnetostatic forces, causes the reproduction layer and the supplementary reproduction layer to abruptly change from an in-plane magnetization state to a perpendicular magnetization state, and high reproduction resolution to be obtained.

In this manner, in the magneto-optical storage medium, the magnetic domain duplicated from the storage layer to the supplementary reproduction layer at a high reproduction resolution achieved by the provision of the in-plane magnetization layer is expanded and duplicated to the reproduction layer; thereby a high reproduction resolution and satisfactory reproduction signal quality are obtainable. Thus, even when signals whose cycle is equal to, or below, diffraction limits of light are recorded in the storage layer, the magneto-optical storage medium can reproduce the signals without reducing the amplitude.

In order to better achieve the above object, the magneto-optical storage medium in accordance with the present invention may further include a non-magnetic intermediate layer, deposited between the in-plane magnetization layer and the storage layer, for breaking exchange coupling between the storage layer and the supplementary reproduction layer.

According to the arrangement, the non-magnetic intermediate layer formed between the in-plane magnetization layer and the storage layer breaks exchange coupling between the in-plane magnetization layer and the storage layer.

Consequently, the magneto-optical storage medium allows use of a thinner in-plane magnetization layer. In other words, by breaking exchange coupling between the in-plane magnetization layer and the storage layer, the provision of the non-magnetic intermediate layer stabilizes the in-plane magnetization state of the supplementary reproduction layer even with a relatively thin in-plane magnetization layer being used. Consequently, the supplementary reproduction layer and the storage layer are coupled firmly with each other through magnetostatic forces only where the layers are heated, which improves the reproduction resolution of the supplementary reproduction layer.

If the supplementary reproduction layer and the storage layer are separated from each other by a large distance, magnetostatic forces weaken between the supplementary reproduction layer and the storage layer, which poses an obstacle in duplicating magnetic domains in a stable manner and degrades reproduction signal quality. Conversely, if the in-plane magnetization layer is thin owing to the provision of a non-magnetic intermediate layer, degradation of reproduction signal quality is prevented.

In this manner, the in-plane magnetization layer, provided so as to realize higher reproduction resolution, can be made thinner as a result of the formation of the non-magnetic intermediate layer; consequently, the provision of the in-plane magnetization layer enables the magneto-optical storage medium to achieve even higher reproduction resolution and satisfactory reproduction signal quality, as well as to achieve reductions in recording power and reproduction power, while restraining adverse effects from an increase in thickness.

In order to better achieve the above object, the magneto-optical storage medium in accordance with the present invention may further include a magnetic flux adjusting layer deposited adjacent to the storage layer, the magnetic flux adjusting layer being made of a perpendicular magnetization film having a different magnetic polarity from the storage layer and a Curie temperature lower than that of the storage layer.

According to the arrangement, the magnetic flux adjusting layer having a different magnetic polarity from the storage layer, when deposited adjacent to the storage layer, generates exchange coupling forces with the storage layer, and causes the total magnetizations of the magnetic flux adjusting layer and that of the storage layer to offset each other, thereby creating a state where there is substantially no leakage magnetic flux, which is the sum of the total magnetizations of the two layers. In an area, of the magnetic flux adjusting layer, that is heated up to or beyond the Curie temperature of the magnetic flux adjusting layer but not exceeding the Curie temperature of the storage layer, the magnetic flux adjusting layer no longer has a total magnetization, leaving the storage layer alone that has a total magnetization; consequently, a leakage magnetic flux arises from the storage layer. This enables generation of a large leakage magnetic flux from the storage layer only at temperatures at which the magnetic information in the storage layer is duplicated to the supplementary reproduction layer.

Especially, the Curie temperature of the magnetic flux adjusting layer can be specified substantially equal to the transition temperature Tp2 at which the supplementary reproduction layer changes from an in-plane magnetization state to a perpendicular magnetization state. This specification enables an area of the supplementary reproduction layer where the supplementary reproduction layer exhibits a perpendicular magnetization state to substantially correspond to an area of the storage layer from which a leakage magnetic flux arises.

In this manner, owing to the stacking of the storage layer and the magnetic flux adjusting layer that exhibit mutually different magnetic properties, the magneto-optical storage medium optimizes the leakage magnetic flux, and performs magnetic domain expansion reproduction at a higher resolution in a more stable manner.

In order to better achieve the above object, the magneto-optical storage medium in accordance with the present invention may have the magnetic properties of the reproduction layer, the supplementary reproduction layer, and the storage layer adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

According to the arrangement, the leakage magnetic flux arising from the storage layer at the transition temperature Tp1 is specified to be weaker than the leakage magnetic flux arising from the storage layer at the transition temperature Tp2, and the Curie temperature of the reproduction layer is specified to be lower than the Curie temperature of the supplementary reproduction layer. These specifications cause the total magnetization of the reproduction layer to be smaller than the total magnetization of the supplementary reproduction layer, and the magnetostatic coupling forces between the storage layer and the reproduction layer at the transition temperature Tp1 to be weaker than the magnetostatic coupling forces between the storage layer and the supplementary reproduction layer at the transition temperature Tp2.

Therefore, the magnetostatic coupling forces between the supplementary reproduction layer and the storage layer are stronger than the magnetostatic coupling forces between the reproduction layer and the storage layer; the supplementary reproduction layer and the storage layer are thus coupled firmly with each other, allowing the magnetic information in the storage layer to be accurately duplicated to the supplementary reproduction layer.

In this manner, the magneto-optical storage medium optimizes the magnetostatic coupling state between the storage layer and the reproduction layer and the magnetostatic coupling state between the storage layer and the supplementary reproduction layer, and thereby performs stable magnetic domain duplication and magnetic domain expansion reproduction.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIG. 1 to FIG. 5, the following description will explain an embodiment in accordance with the present invention.

Figure 1:
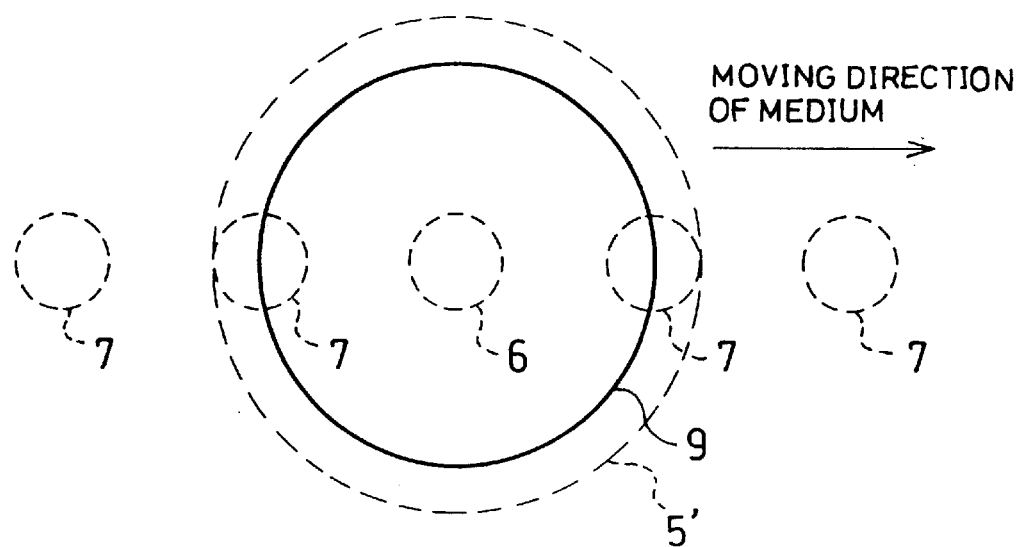
FIG. 1 is a schematic plan view showing a magnetization state of the magneto-optical storage medium shown in FIG. 2 during reproduction.
Figure 2:
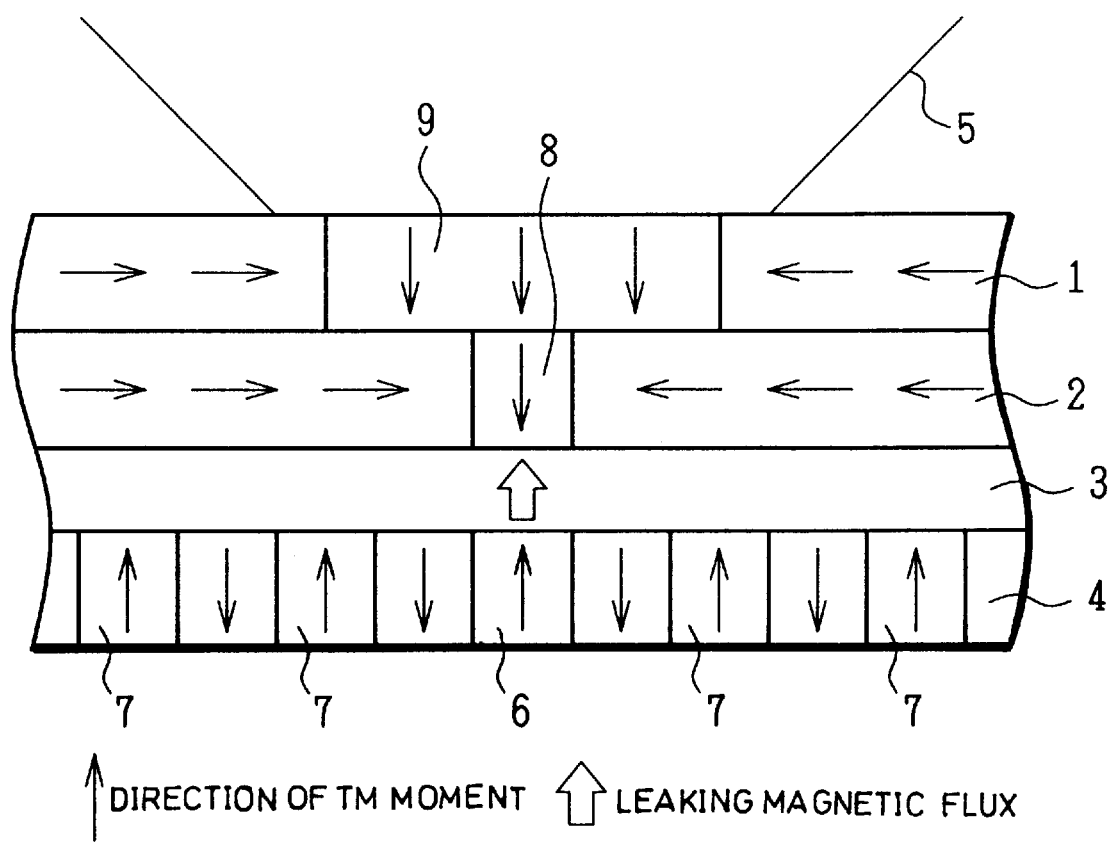
FIG. 2 is a schematic cross-sectional view showing a magnetization state of a magneto-optical storage medium of an embodiment in accordance with the present invention during reproduction.

First of all, referring to FIG. 1 and FIG. 2, principals in reproduction of the magneto-optical storage medium of the present embodiment will be explained. FIG. 1 and FIG. 2 are plan and cross-sectional views, respectively, schematically illustrating a magnetization state of the magneto-optical storage medium during reproduction.

As shown in FIG. 2, the magneto-optical storage medium of the present embodiment is arranged from sequentially stacked layers including a reproduction layer 1, a supplementary reproduction layer 2, a non-magnetic intermediate layer 3, and a storage layer 4. It should be noted with regard to the arrows in FIG. 2 that the black ones denote the directions of the magnetization moments of transition metals (TMs), and the outlined one denotes the direction of a leakage magnetic flux.

The reproduction layer 1 is made of an alloy of rare earth and transition metals, that exhibits an in-plane magnetization state at room temperature and changes to a perpendicular magnetization state with rising temperature. The supplementary reproduction layer 2 is made of an alloy of rare earth and transition metals that exhibits an in-plane magnetization state at room temperature and changes to a perpendicular magnetization state with rising temperature. The non-magnetic intermediate layer 3 is made of a non-magnetic film. The storage layer 4 is made of an alloy of rare earth and transition metals that are a perpendicular magnetization film.

For reproduction, a light beam 5 (light beam spot 5' in FIG. 1) is projected onto the magneto-optical storage medium on the reproduction layer 1 in such a manner that the light beam 5 is converged at the magnetic recording domain 6 to be reproduced and its surrounding area in the storage layer 4. A leakage magnetic flux arising from the magnetic recording domain 6 in the storage layer 4 is magnetostatically coupled with the total magnetization of the supplementary reproduction layer 2 according to a temperature distribution produced in the magneto-optical storage medium as a result of the projection of the converged light beam 5; consequently, the magnetic information in the magnetic recording domain 6 in the storage layer 4 is duplicated to an area where the supplementary reproduction layer 2 has changed to a perpendicular magnetization state, forming a magnetic domain 8. Then, the magnetic domain 8 formed in the supplementary reproduction layer 2 as a result of the duplication is expanded and duplicated to the reproduction layer 1 by exchange forces, forming a magnetic domain 9 in the reproduction layer 1. Finally, the information stored in the magnetic recording domain 6 in the storage layer 4 is reproduced through the reproduction of the magnetic domain 9.

Here, to impart such magnetic properties that an in-plane magnetization state is established at room temperature and a perpendicular magnetization state is established at an elevated temperature, the reproduction layer 1 and the supplementary reproduction layer 2 are RE rich: in other words, the reproduction layer 1 and the supplementary reproduction layer 2 contain a greater RE moment than in a compensation composition where the magnitude of the rare earth (RE) moment strikes a balance with the magnitude of the transition (TM) moment. Therefore, in the reproduction layer 1 and the supplementary reproduction layer 2, the TM moment and the total magnetization are antiparallel.

Meanwhile, the storage layer 4 is preferably adjusted so as to have such a composition that the area where temperature is elevated develops a large leakage magnetic flux. Therefore, a perpendicular magnetization film is used as the storage layer 4, the perpendicular magnetization film being TM rich, or in other words, containing a greater TM moment than in a compensation composition where the compensation temperature is in a vicinity of room temperature and the magnitude of the rare earth (RE) moment strikes a balance with the magnitude of the transition (TM) moment at temperatures higher than room temperature. In such an event, in the storage layer 4, the TM moment and the total magnetization are parallel. It should be noted that in such an event where the storage layer 4 and the supplementary reproduction layer 2 are magnetostatically coupled with each other, since the duplication takes place so that the total magnetizations in the layers 4 and 2 become parallel, the TM moment in the storage layer 4 and the TM moment in the supplementary reproduction layer 2 are antiparallel.

Further, the magnetic domain 8 formed in the supplementary reproduction layer 2 through the duplication is expanded and duplicated to the reproduction layer 1 and thereby forms the magnetic domain 9; therefore the transition temperature Tp1 at which the reproduction layer 1 changes to a perpendicular magnetization state is set lower than the transition temperature Tp2 at which the supplementary reproduction layer 2 changes to a perpendicular magnetization state.

In addition, the supplementary reproduction layer 2 and the storage layer 4 are coupled firmly with each other through magnetostatic forces, allowing the magnetic information in the storage layer 4 to be accurately duplicated to the supplementary reproduction layer 2. Therefore, the magnetostatic coupling between the reproduction layer 1 and the storage layer 4 is specified to be weaker than those between the supplementary reproduction layer 2 and the storage layer 4.

In other words, in the magneto-optical storage medium, the leakage magnetic flux arising from the storage layer 4 at temperatures around the transition temperature Tp1 is specified to be weaker than the leakage magnetic flux arising from the storage layer 4 at temperatures around the transition temperature Tp2, and the Curie temperature Tc1 of the reproduction layer 1 is specified to be lower than the Curie temperature Tc2 of the supplementary reproduction layer 2. The specifications cause the total magnetization of the reproduction layer 1 to be smaller than the total magnetization of the supplementary reproduction layer 2, and the magnetostatic coupling forces between the storage layer 4 and the reproduction layer 1 at temperatures around the transition temperature Tp1 to be weaker than the magnetostatic coupling forces between the storage layer 4 and the supplementary reproduction layer 2 at temperatures around the transition temperature Tp2. Therefore, the duplication to the supplementary reproduction layer 2 by means of magnetostatic coupling takes place smoothly, and so do the expansion duplication to the reproduction layer 1 by means of exchange coupling.

Further, as shown in FIG. 1, the magnetization state of the magnetic recording domain 6 to be reproduced is duplicated to the supplementary reproduction layer 2 (magnetic domain 8) as a result of the heating with the light beam 5 (light beam spot 5'), and only the magnetic domain 9 formed in the reproduction layer 1 through the expansion duplication is reproduced by the light beam 5. In other words, the magnetic information in the magnetic recording domain 6 and in the magnetic recording domains 7, which refer to all the magnetic recording domains other than the magnetic recording domain 6 in the storage layer 4, is by no means directly reproduced using the light beam 5. Hence, only the magnetic recording domain 6 can be reproduced without interference from the magnetic recording domains 7 that are adjacent to the magnetic recording domain 6.

The following description will be explain a magneto-optical disk that is an application of the magneto-optical storage medium.

Figure 3:
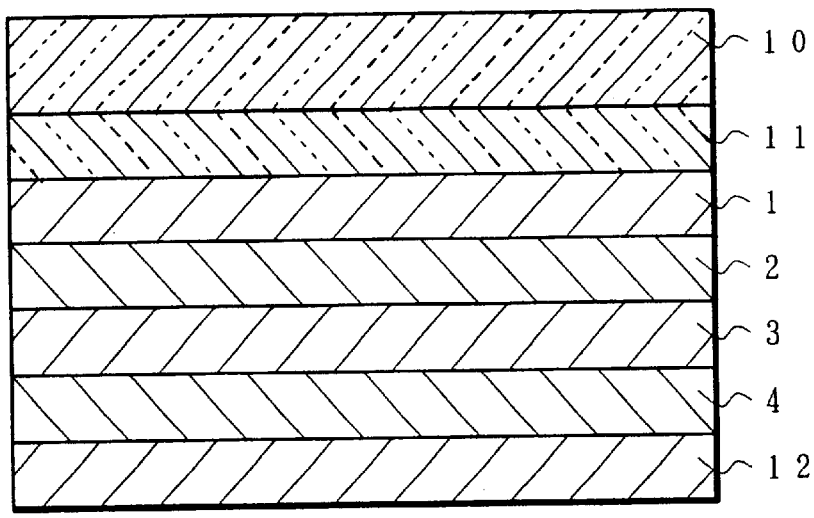
FIG. 3 is a schematic cross-sectional view showing the arrangement of a magneto-optical disk that is an application of the magneto-optical storage medium shown in FIG. 2.

As shown in FIG. 3, the magneto-optical disk includes a transparent dielectric protective layer 11, a reproduction layer 1, a supplementary reproduction layer 2, a non-magnetic intermediate layer 3, a storage layer 4, and a protective layer 12, all the layers being sequentially stacked on a substrate 10.

The magneto-optical disk employs a Curie temperature recording system as its recording system. More specifically, a light beam 5 emitted from a semiconductor laser device which serves as a light source is directed past the substrate 10 and the transparent dielectric protective layer 11 and focused on the reproduction layer 1 to heat the storage layer 4 up to its Curie temperature Tc4 or higher. An external magnetic field is applied simultaneously with the heating to control the magnetization direction of the storage layer 4, thereby recording data on the magneto-optical disk.

Meanwhile, the magneto-optical disk is reproduced through a magneto-optical effect known as the pole Kerr effect, by projecting a converged light beam 5 that is specified to have a smaller power than that used for recording. The pole Kerr effect refers to a phenomenon where the direction of the rotation of the polarization plane of reflected light is turned around by the magnetization whose direction is perpendicular to a light entering surface.

Made of a polycarbonate or other transparent base materials for example, the substrate 10 is formed in a disk shape and has, on its surface where layers are formed, guide grooves for guiding the light beam 5. It should be noted that in the present embodiment the guide grooves may serve so as to store data only either on the lands or on the guide grooves, and alternatively serve so as to store data both on the lands and the guide grooves.

A transparent dielectric, such as AlN, SiN, AlSiN, $Ta_2O_3$, is preferably used for the transparent dielectric protective layer 11. The thickness of the transparent dielectric protective layer 11 is specified so as to produce satisfactory interference effects on the incident light beam 5 and increase the pole Kerr rotation angle of the medium. More specifically, the transparent dielectric protective layer 11 is specified to have a thickness of about $\lambda/(4n)$ where $\lambda$ is the wavelength of the light beam 5 and n is the refractive index of the transparent dielectric protective layer 11. For example, supposing that the light beam 5 has a wavelength $\lambda$ of 680 nm, since the transparent dielectric protective layer 11 has a refractive index n of about 1.7 to 2.5, the thickness should be specified to about 40 nm to 100 nm.

The reproduction layer 1 is a magnetic film, made of an alloy of rare earth and transition metals, that exhibits an in-plane magnetization state at room temperature, changes to a perpendicular magnetization state at the transition temperature Tp1 which is higher than room temperature, and retains the perpendicular magnetization state up to the Curie temperature Tc1.

The supplementary reproduction layer 2 is a magnetic film, made of an alloy of rare earth and transition metals, that exhibits an in-plane magnetization state at room temperature, changes to a perpendicular magnetization state at the transition temperature Tp2 which is higher than room temperature, and retains the perpendicular magnetization state up to the Curie temperature Tc2.

In the present embodiment, the Curie temperature Tc1 of the reproduction layer 1 is specified to be lower than the Curie temperature Tc2 of the supplementary reproduction layer 2, and the total magnetization of the reproduction layer 1 is specified to be smaller than the total magnetization of the supplementary reproduction layer 2. This causes the magnetostatic coupling between the reproduction layer 1 and the storage layer 4 to be stronger than the magnetostatic coupling between the supplementary reproduction layer 2 and the storage layer 4, and thus allows the magnetic information in the magnetic recording domain 6 in the storage layer 4 to be duplicated to the magnetic domain 8 in the supplementary reproduction layer 2 by the magnetostatic coupling.

Further, the transition temperature Tp1 at which the reproduction layer 1 changes to a perpendicular magnetization state is specified to be lower than the transition temperature Tp2 at which the supplementary reproduction layer 2 changes to a perpendicular magnetization state. This arrangement enables the magnetic domain expansion duplication from the magnetic domain 8 in the supplementary reproduction layer 2 to the magnetic domain 9 in the reproduction layer 1.

The Curie temperature Tc1 of the reproduction layer 1 is preferably not less than 160° C. and not more than 300° C. If Tc1<160° C., since the Kerr rotation angle decreases tangibly with the lowered Curie temperature Tc1 of the reproduction layer 1, the strength of reproduced signals decreases, and no satisfactory reproduction properties are obtainable. If Tc1>300° C., the elevated Curie temperature Tc1 of the reproduction layer 1 increases the magnetization of the reproduction layer 1 at temperatures around the transition temperature Tp1 of the reproduction layer 1, and thereby reinforces the magnetostatic coupling between the reproduction layer 1 and the storage layer 4 at temperatures around the transition temperature Tp1. This interrupts the magnetic domain expansion duplication from the supplementary reproduction layer 2 to the reproduction layer 1, and causes reproduction noise to increase and reproduction signal quality to deteriorate.

The transition temperature Tp1 at which the reproduction layer 1 changes to a perpendicular magnetization state is preferably not less than 60° C. and not more than 180° C. If Tp1<60° C., the lowered transition temperature Tp1 poses an obstacle in maintaining an in-plane magnetization state at room temperature in a stable manner, and causes a larger portion of the reproduction layer 1 to change to a perpendicular magnetization state. This renders the magnetic domain expansion reproduction more likely to be affected by external disturbances, such as a leakage magnetic field produced by an optical pickup, and thereby reduces stability in the magnetic domain expansion reproduction. If Tp1>180° C., a smaller portion of the reproduction layer 1 changes to a perpendicular magnetization state, and no satisfactory magnetic domain expansion effect is obtainable, causing the strength of reproduced signals to decrease and reproduction signal quality to tangibly deteriorate.

The Curie temperature Tc2 of the supplementary reproduction layer 2 is preferably not less than 230° C. If Tc2<230° C., the total magnetization of the supplementary reproduction layer 2 decreases with the lowered Curie temperature Tc2 of the supplementary reproduction layer 2 at temperatures around the transition temperature Tp2 of the supplementary reproduction layer 2. This weakens the magnetostatic coupling between the storage layer 4 and the supplementary reproduction layer 2 at temperatures around the transition temperature Tp2, and thus reduces stability in the magnetic domain duplication from the storage layer 4 to the supplementary reproduction layer 2. It should be noted that a higher Curie temperature Tc2 increases the total magnetization of the supplementary reproduction layer 2 at temperatures around the transition temperature Tp2, and thereby establishes stronger magnetostatic coupling between the storage layer 4 and the supplementary reproduction layer 2; however, the upper limit of the Curie temperature Tc2 is restricted by the material to be used.

Further, the transition temperature Tp2 at which the supplementary reproduction layer 2 changes to a perpendicular magnetization state is at least specified to be higher than the transition temperature Tp1 and lower than the Curie temperature Tc4 of the storage layer 4. Specifically, the transition temperature Tp2 of the supplementary reproduction layer 2 is preferably not less than 100° C. and not more than 230° C. If Tp1<100° C., since the supplementary reproduction layer 2 changes to a perpendicular magnetization state at a relatively low temperature, the reproduction resolution deteriorates, and reproduction signal quality deteriorates at small mark lengths. If Tp2>230° C., since the transition temperature Tp2 at which the supplementary reproduction layer 2 changes to a perpendicular magnetization state is relatively close to the Curie temperature Tc4 of the storage layer 4, a marginal variation in reproduction power may heat the storage layer 4 beyond the Curie temperature Tc4 and erase stored information, rendering it impossible to establish a practical reproduction power margin.

The thickness of the reproduction layer 1 is preferably specified in a range not less than 20 nm and not more than 60 nm. If the reproduction layer 1 is less than 20 nm thick, since a part of the light beam passes through the reproduction layer 1 and reflects at the supplementary reproduction layer 2, the amount of light reflecting at the reproduction layer 1 decreases; consequently, the strength of reproduced signals decreases, and reproduction signal quality deteriorates. If the reproduction layer 1 is more than 60 nm thick, the increased thickness tangibly degrades recording sensitivity.

Further, the thickness of the supplementary reproduction layer 2 is preferably specified in a range not less than 20 nm and not more than 60 nm. If the supplementary reproduction layer 2 is less than 20 nm thick, the magnetostatic coupling with the leakage magnetic flux arising from the storage layer 4 weakens, thereby reducing stability in the magnetic domain duplication from the storage layer 4 to the supplementary reproduction layer 2. If the supplementary reproduction layer 2 is more than 60 nm thick, the increased thickness tangibly degrades recording sensitivity.

To impart the aforementioned magnetic properties, a thin film of GdFe, GdFeCo, GdNdFeCo, or other alloys of rare earth and transition metals may be employed as the reproduction layer 1 and the supplementary reproduction layer 2. A metal element, such as Ta, Cr, Ti, Al, and Si, may be added to the material to improve the resistance of the material against humidity and oxidation.

The non-magnetic intermediate layer 3 is a non-magnetic film for breaking the coupling established between the storage layer 4 and the supplementary reproduction layer 2 through exchange forces. A non-magnetic metal, such as Al, Si, Ta, Ti, Au, or Cu, or a non-magnetic alloy of these non-magnetic metals can be used for the non-magnetic intermediate layer 3. Alternatively, a non-magnetic dielectric, such as AlN, SiN, or AlSiN, may be used.

The non-magnetic intermediate layer 3 is preferably specified in a range not less than 0.5 nm and not more than 40 nm. If the non-magnetic intermediate layer 3 is less than 0.5 nm thick, the non-magnetic intermediate layer 3 cannot be fabricated uniformly; the non-uniform non-magnetic intermediate layer 3 poses an obstacle in completely breaking the exchange coupling between the supplementary reproduction layer 2 and the storage layer 4 and instead establishing stable magnetostatic coupling. If the non-magnetic intermediate layer 3 is more than 40 nm thick, the supplementary reproduction layer 2 is separated from the storage layer 4 by a relatively large distance, which weakens the magnetostatic coupling forces between the supplementary reproduction layer 2 and the storage layer 4 and reduces stability in the magnetic domain duplication from the storage layer 4 to the supplementary reproduction layer 2.

The storage layer 4 is a perpendicular magnetization film made of an alloy of rare earth and transition metals, and is preferably specified to have a compensation temperature Tcomp4 not less than −70° C. and not more than 60° C. If Tcomp4<−70° C., since the storage layer 4 has a relatively large magnetization at temperatures around the transition temperature Tp1 of the reproduction layer 1, the magnetostatic coupling between the storage layer 4 and the reproduction layer 1 strengthens at temperatures around the transition temperature Tp1. This interrupts stable magnetic domain expansion duplication to the reproduction layer 1, and degrades reproduction signal quality. If Tcomp4>60° C., since the magnetization of the storage layer 4 weakens at temperatures around the transition temperature Tp2 of the supplementary reproduction layer 2, the magnetostatic coupling between the storage layer 4 and the supplementary reproduction layer 2 weakens at temperatures around the transition temperature Tp2. This reduces stability in the magnetic domain duplication from the storage layer 4 to the supplementary reproduction layer 2, and degrades reproduction signal quality.

The Curie temperature Tc4 of the storage layer 4 is at least specified to be higher than the transition temperature Tp2 at which the supplementary reproduction layer 2 changes to a perpendicular magnetization state. Specifically, the Curie temperature Tc4 is preferably not less than 180° C. and not more than 300° C.

If Tc4<180° C., the Curie temperature Tc4 becomes too low; when the magnetic recording domain 6 is duplicated to the supplementary reproduction layer 2 by heating the supplementary reproduction layer 2 up to the transition temperature Tp2 or higher during reproduction, the temperature of the storage layer 4 may reach or exceed the Curie temperature Tc4 even with a small increment, causing stored information to be lost. In short, the magneto-optical disk has a narrower reproduction power margin. In addition, the lowered Curie temperature Tc4 of the storage layer 4 causes the leakage magnetic flux arising from the storage layer 4 to decrease accordingly, and therefore poses an obstacle in maintaining a stable magnetostatic coupling state between the supplementary reproduction layer 2 and the storage layer 4, resulting in a degradation of reproduction signal quality.

If Tc4>300° C., the storage layer 4 needs to be heated up to 300° C. or higher to record information, tangibly degrading recording sensitivity. In addition, since the reproduction layer 1, the supplementary reproduction layer 2, and the storage layer 4 are heated up to 300° C. or higher during recording and erasure, reproduction signal quality deteriorates with a deterioration in the magnetic properties of the magnetic layers.

The thickness of the storage layer 4 is preferably specified in a range not less than 30 nm and not more than 120 nm. If the storage layer 4 is less than 30 nm thick, a resultant smaller leakage magnetic flux arising from the storage layer 4 poses an obstacle in maintaining a stable magnetostatic coupling state between the supplementary reproduction layer 2 and the storage layer 4, degrading reproduction signal quality. If the storage layer 4 is more than 120 nm thick, the increased thickness tangibly degrades recording sensitivity.

A perpendicular magnetization film made of TbFe, TbFeCo, DyFe, DyFeCo, TbDyFe, TbDyFeCo, or other materials may be employed as the storage layer 4 having the aforementioned magnetic properties. A metal element, such as Ta, Cr, Ti, Al, and Si, may be added to the material to improve the resistance of the material against humidity and oxidation.

The protective layer 12 is made of a non-magnetic metal alloy containing either a transparent dielectric, such as AlN, SiN, AlSiN, or $Ta_2O_3$, or a metal, such as Al, Ti, Ta, or Ni, and serves to prevent oxidation of the alloys of rare earth and transition metals used as the reproduction layer 1, the supplementary reproduction layer 2, and the storage layer 4. The thickness of the protective layer 12 is specified in a range from 5 nm to 60 nm.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 4 by deposition, the supplementary storage layer being made of a perpendicular magnetization film, containing, for example, GdFeCo, GdTbFeCo, or GdDyFeCo, that has smaller coercive forces than those of the storage layer 4 and a higher Curie temperature than that of the storage layer 4.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 3.

First, a polycarbonate substrate 10 formed in a disk shape with guide grooves is placed in a sputtering device provided with an Al target, a first GdFeCo alloy target, a second GdFeCo alloy target, and a TbFeCo alloy target. Then, the sputtering device is evacuated of air until the pressure reaches $1\times10^{-6}$ Torr. Thereafter, a mixed gas of argon and nitrogen is introduced, and electric power is supplied to the Al target, so as to form an 80 nm thick, AlN, transparent dielectric protective layer 11 on the substrate 10 at a gas pressure of $4\times10^{-3}$ Torr.

Secondly, the sputtering device is evacuated of air again until the pressure reaches $1\times10^{-6}$ Torr. Thereafter, an argon gas is introduced, and electric power is supplied to the first GdFeCo alloy target, so as to form a 30 nm thick, $Gd_{0.29}(Fe_{0.88}Co_{0.12})_{0.71}$, reproduction layer 1 on the transparent dielectric protective layer 11 at a gas pressure of $4\times10^{-3}$ Torr. It should be noted that the resultant reproduction layer 1 exhibited an in-plane magnetization state at room temperature, changed to a perpendicular magnetization state at the temperature of 90° C., and had a Curie temperature Tc1 of 270° C.

Thirdly, electric power is continuously supplied to the second GdFeCo alloy target so as to form a 30 nm thick, $Gd_{0.33}(Fe_{0.78}Co_{0.22})_{0.67}$, supplementary reproduction layer 2 on the reproduction layer 1 at a gas pressure of $4\times10^{-3}$ Torr. It should be noted that the resultant supplementary reproduction layer 2 exhibited an in-plane magnetization state at room temperature, and changed to a perpendicular magnetization state at the temperature of 160° C., and had a Curie temperature Tc2 of 350° C.

Fourthly, electric power is continuously supplied to the Al target so as to form a 1 nm thick, Al, non-magnetic intermediate layer 3 on the supplementary reproduction layer 2 at a gas pressure of $4\times10^{-3}$ Torr.

Fifthly, electric power is continuously supplied to the TbFeCo alloy target so as to form a 60 nm thick, $Tb_{0.25}(Fe_{0.84}Co_{0.16})_{0.75}$, storage layer 4 on the non-magnetic intermediate layer 3 at a gas pressure of $4\times10^{-3}$ Torr. It should be noted that the resultant storage layer 4 had a compensation temperature of 25° C. and a Curie temperature Tc4 of 270° C., and was a perpendicular magnetization film that had a magnetization perpendicular to its surface throughout the temperature range from room temperature to the Curie temperature Tc4.

Sixly, a mixed gas of argon and nitrogen is introduced, and electric power is supplied to the Al target, so as to form a 20 nm thick, AlN, protective layer 12 on the storage layer 4 at a gas pressure of $4\times10^{-3}$ Torr.

Now, referring to FIG. 4, the temperature dependency of the total magnetization of the magnetic layers will be explained.

The reproduction layer 1 (c11) exhibits an in-plane magnetization state at 25° C. As temperature rises, the total magnetization decreases, and at 90° C. the reproduction layer 1 changes to a perpendicular magnetization state; at 270° C. (Curie temperature Tc1) the total magnetization becomes zero. The supplementary reproduction layer 2 (cl2) exhibits an in-plane magnetization state at 25° C. As temperature rises, the total magnetization decreases, and at 160° C. the supplementary reproduction layer 2 changes to a perpendicular magnetization state; at 350° C. (Curie temperature Tc2) the total magnetization becomes zero. The storage layer 4 (cl4) has a compensation temperature of 25° C.; the total magnetization, which is zero at 25° C., increases with rising temperature and reaches its maximum value at a temperature around 160° C.; as temperature rises further, the total magnetization decreases and returns to zero at 270° C. (Curie temperature Tc4).

Figure 4:
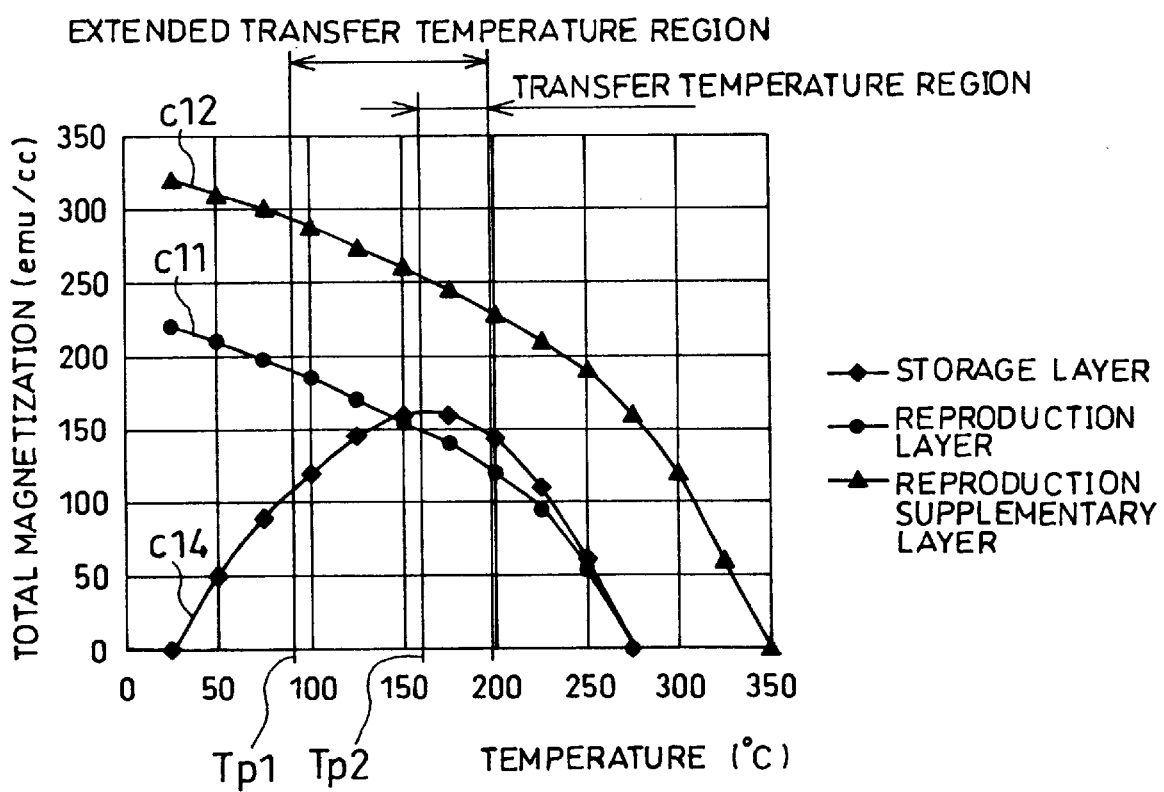
FIG. 4 is a graph showing temperature dependency of the total magnetization of the magneto-optical disk shown in FIG. 3.

Further referring to FIG. 4, the total magnetization of the storage layer 4 is greater at temperatures around 160° C. (transition temperature Tp2) at which the supplementary reproduction layer 2 changes to a perpendicular magnetization state than at temperatures around 90° C. (transition temperature Tp1) at which the reproduction layer 1 changes to a perpendicular magnetization state. Besides, the total magnetization of the supplementary reproduction layer 2 at temperatures around the transition temperature Tp2 is greater than the total magnetization of the reproduction layer 1 at temperatures around the transition temperature Tp1. In addition, the supplementary reproduction layer 2 is positioned closer to the storage layer 4 than is the reproduction layer 1.

Therefore, the magnetostatic coupling between the supplementary reproduction layer 2 and the storage layer 4 at the transition temperature Tp2 is stronger than the magnetostatic coupling between the reproduction layer 1 and the storage layer 4 at the transition temperature Tp1; as a result, at a temperature (in the duplication temperature range), around the transition temperature Tp2, at which the magnetic information in the storage layer 4 is duplicated to the supplementary reproduction layer 2, the magnetic information in the storage layer 4 is duplicated to the supplementary reproduction layer 2 by the magnetostatic coupling, and the magnetic information duplicated to the supplementary reproduction layer 2 is amplified and duplicated to the reproduction layer 1 by exchange coupling.

(2) Playback Properties

The following description will explain playback properties of a magneto-optical disk (denoted as sample #1). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 6 mW was continuously projected while applying a recording magnetic field that was modulated at ±15 kA/m, so as to form a repetitive pattern of upward and downward magnetizations in the storage layer 4 in accordance with the direction of the recording magnetic field. Then, by altering the modulation frequency of the recording magnetic field, a magnetic domain pattern was recorded with mark lengths varying from 0.2 to 0.5 µm. Here, the mark length is equal to the length of the magnetic recording domain and also equal to half the pitch between two adjacent magnetic recording domains.

Figure 5:
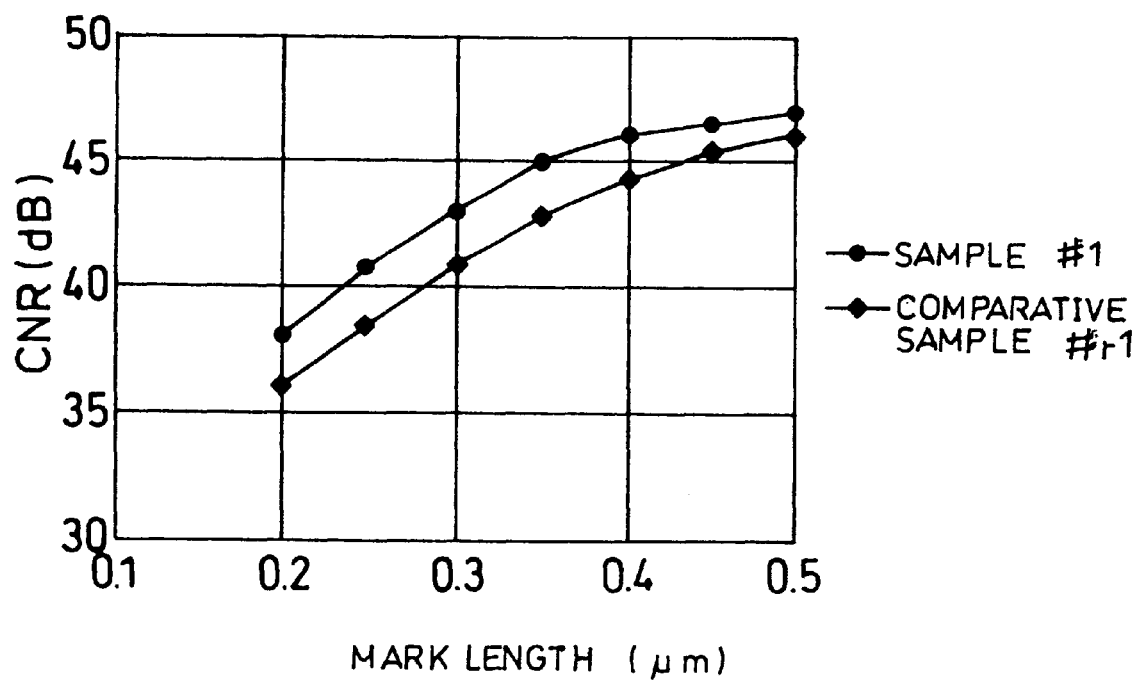
FIG. 5 is a graph showing the mark length dependency of the signal-to-noise ratio of the magneto-optical disk shown in FIG. 3.

FIG. 5 is a graph showing the mark length dependency of the CNR (signal-to-noise ratio) of sample #1, measured by continuously projecting a playback laser of 2.5 mW. For comparison, FIG. 5 also shows, as a graph, the mark length dependency of the CNR of the magneto-optical disk (denoted as comparative sample #r1), which was mentioned earlier in reference to conventional technology (see FIG. 29 and FIG. 30), wherein the magnetic domain expansion reproduction is enabled by exchange coupling established between the storage layer 204 and the reproduction layer 201 and between the storage layer 204 and the supplementary reproduction layer 202.

Figure 29:
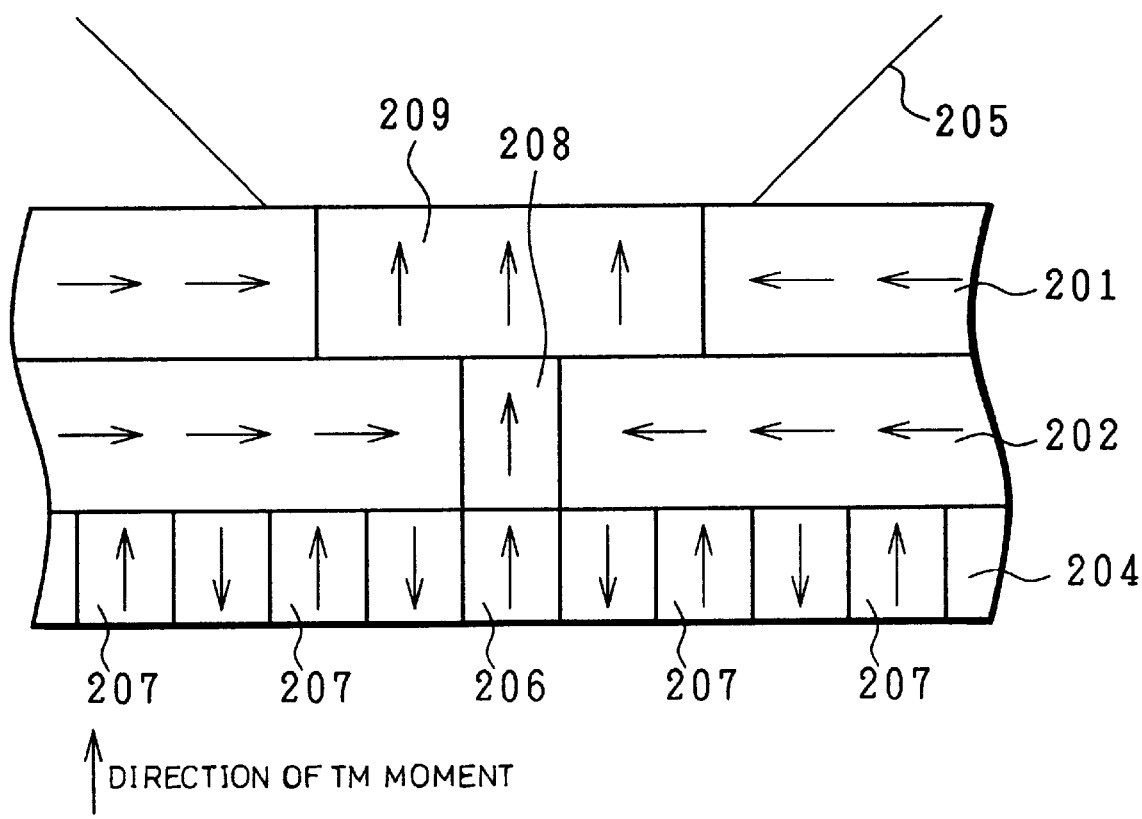
FIG. 29 is a schematic cross-sectional view showing a magnetization state of a conventional magneto-optical storage medium during reproduction.
Figure 30:
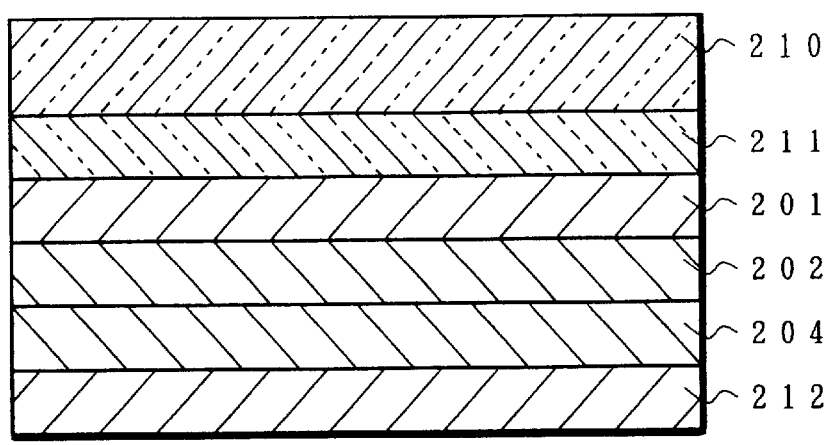
FIG. 30 is a schematic cross-sectional view showing the arrangement of a magneto-optical disk that is an application of the conventional magneto-optical storage medium shown in FIG. 29.

As shown in FIG. 29, comparative sample #r1 is a magneto-optical disk including an 80 nm thick, AlN layer as a transparent dielectric protective layer 211, a 100 nm thick, $Gd_{0.30}(Fe_{0.67}Co_{0.33})_{0.70}$ layer as a reproduction layer 201, a 100 nm thick, $Gd_{0.33}(Fe_{0.67}Co_{0.33})_{0.67}$ layer as a supplementary reproduction layer 202, a 40 nm thick, $Tb_{0.25}(Fe_{0.84}Co_{0.16})_{0.75}$ layer as a storage layer 204, and a 20 nm thick, AlN layer as a protective layer 212. It should be noted that in comparative sample #r1, the reproduction layer 201 and the supplementary reproduction layer 202 change from an in-plane magnetization state to a perpendicular magnetization state at 100° C. and 150° C. respectively.

Here, in comparative sample #r1, exchange coupling is established between the storage layer 204 and the reproduction layer 201 and between the storage layer 204 and the supplementary reproduction layer 202. Therefore, unless the reproduction layer 201 and the supplementary reproduction layer 202 are as thick as 100 nm as mentioned previously, such properties cannot be imparted that the layers exhibit an in-plane magnetization state at room temperature and change to a perpendicular magnetization state with rising temperature. Consequently, comparative sample #r1 is thick, and requires a greater laser power for playback than sample #1. Comparative sample #r1 was therefore evaluated with the recording laser power of 9.4 mw and the reproduction laser power of 3.6 mW.

Referring to FIG. 5, a comparison of CNR between sample #1 and comparative sample #r1 shows that sample #1 has higher CNR values at all mark lengths. This is a result of improved reproduction resolution achieved by the change of the reproduction layer 1 and the supplementary reproduction layer 2 from an in-plane magnetization state to a perpendicular magnetization state, which takes place more abruptly in sample #1 where the reproduction layer 1, the supplementary reproduction layer 2, and the storage layer 4 are coupled through magnetostatic forces than in comparative sample #r1.

Hence, it would be understood from the comparison that sample #1 of the present embodiment is a magneto-optical disk that exhibits more satisfactory reproduction signal quality and playback sensitivity than comparative sample #r1.

As described above, the magneto-optical storage medium of the present embodiment includes, at least:
  a reproduction layer 1 exhibiting an in-plane magnetization state at room temperature and changing to a perpendicular magnetization state at a transition temperature Tp1;
  a supplementary reproduction layer 2 exhibiting an in-plane magnetization state at room temperature and changing to a perpendicular magnetization state at a transition temperature Tp2;
  a non-magnetic intermediate layer 3; and
  a storage layer 4 made of a perpendicular magnetization film
  the layers being deposited in this order,
  the magneto-optical storage medium being arranged so as to satisfy:

Tp1<Tp2

This arrangement enables the magneto-optical storage medium to amplify the magnetic information stored in the storage layer 4 and duplicate it to the reproduction layer 1, and signals whose cycle is equal to, or below, diffraction limits of light to be reproduced from the storage layer 4 without reducing the amplitude.

Further, as to the magneto-optical storage medium of the present embodiment, the magnetic properties of the reproduction layer 1, the supplementary reproduction layer 2, and the storage layer 4 are adjusted so that the magnetostatic coupling forces between the storage layer 4 and the supplementary reproduction layer 2 at the transition temperature Tp2 are stronger than the magnetostatic coupling forces between the storage layer 4 and the reproduction layer 1 at the transition temperature Tp1.

These adjustments optimize the magnetostatic coupling state between the storage layer 4 and the reproduction layer 1 and the magnetostatic coupling state between the storage layer 4 and the supplementary reproduction layer 2, enabling the magneto-optical storage medium to perform stable magnetic domain duplication and magnetic domain expansion reproduction.

[Embodiment 2]

Referring to FIG. 6 through FIG. 9, the following description will explain another embodiment in accordance with the present invention. Here, for convenience, members of the present embodiment that have the same arrangement and function as members of the previous embodiment, and that are mentioned in the previous embodiment are indicated by the same reference numerals and description thereof is omitted.

Figure 7:
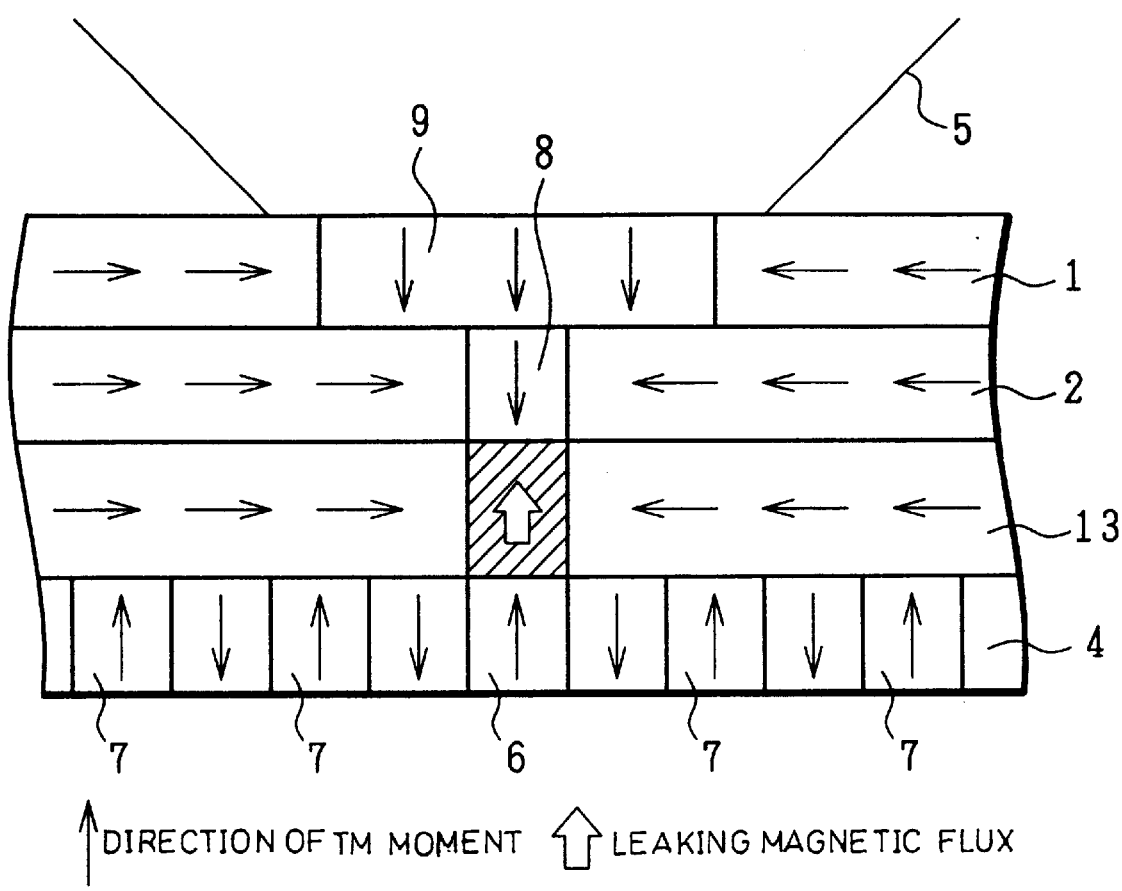
FIG. 7 is a schematic cross-sectional view showing a magnetization state of the magneto-optical storage medium of another embodiment in accordance with the present invention during reproduction.

As shown in FIG. 7, the magneto-optical storage medium of the present embodiment is arranged so as to include, in place of the non-magnetic intermediate layer 3 of the magneto-optical storage medium of the first embodiment (see FIG. 2), an in-plane magnetization layer 13 having a low Curie temperature interposed between the supplementary reproduction layer 2 and the storage layer 4.

Figure 6:
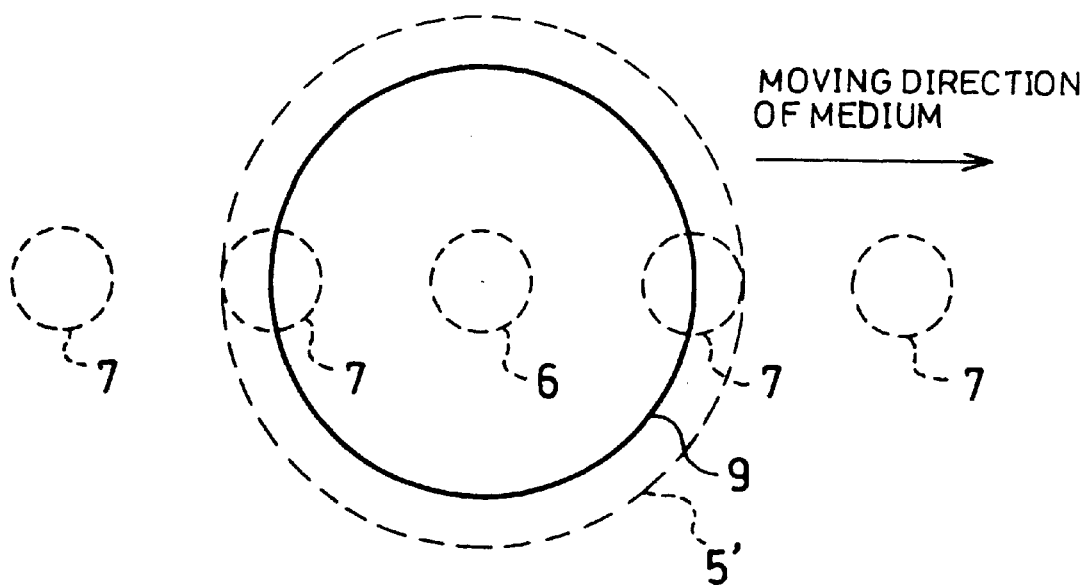
FIG. 6 is a schematic plan view showing a magnetization state of the magneto-optical storage medium shown in FIG. 7 during reproduction.

First of all, referring to FIG. 6 and FIG. 7, principals in reproduction of the magneto-optical storage medium of the present embodiment will be explained. FIG. 6 and FIG. 7 are plan and cross-sectional views, respectively, schematically illustrating a magnetization state of the magneto-optical storage medium during reproduction.

As shown in FIG. 7, the magneto-optical storage medium of the present embodiment is arranged from sequentially stacked layers including a reproduction layer 1, a supplementary reproduction layer 2, an in-plane magnetization layer 13, and a storage layer 4. It should be noted that with regard to the arrows in FIG. 7 that the black ones denote the directions of the magnetization moments of transition metals (TMs), and the outlined one denotes the direction of a leakage magnetic flux.

The in-plane magnetization layer 13 is an in-plane magnetization film interposed between the supplementary reproduction layer 2 and the storage layer 4, and is specified so as to have a Curie temperature Tc13 (Tc) approximating a transition temperature Tp2 (Tc13≦Tp2) at which the supplementary reproduction layer 2 changes from an in-plane magnetization state to a perpendicular magnetization state.

As shown in FIG. 6 and FIG. 7, upon heating the magneto-optical storage medium using a light beam 5 (light beam spot 5'), the magnetic recording domain 6 formed in the storage layer 4 is duplicated to the supplementary reproduction layer 2 by magnetostatic coupling, the magnetic domain 8 formed in the supplementary reproduction layer 2 through the duplication is in turn expanded and duplicated to the reproduction layer 1, forming the magnetic domain 9 in the reproduction layer 1 through the expansion duplication. The principals in reproduction are basically the same as those mentioned earlier in the first embodiment.

Difference, however, lies where in the present embodiment the in-plane magnetization layer 13 whose Curie temperature Tc13 is specified to approximate the transition temperature Tp2 is interposed between the supplementary reproduction layer 2 and the storage layer 4, restraining the leakage magnetic flux arising from the storage layer 4 at temperatures not exceeding the Curie temperature Tc13. Hence, the supplementary reproduction layer 2 exhibits a stable in-plane magnetization state, and the storage layer 4 and the supplementary reproduction layer 2 are coupled firmly with each other through magnetostatic forces only where the layers 4 and 2 are heated, enabling the supplementary reproduction layer 2 to produce an improved reproduction resolution.

In this manner, in the magneto-optical storage medium, the magnetic domain 8 formed in the supplementary reproduction layer 2 at a high reproduction resolution through duplication is expanded and duplicated to the reproduction layer 1; thereby a high reproduction resolution and satisfactory reproduction signal quality are obtainable.

Next, a magneto-optical disk that is an application of the magneto-optical storage medium will be explained.

Figure 8:
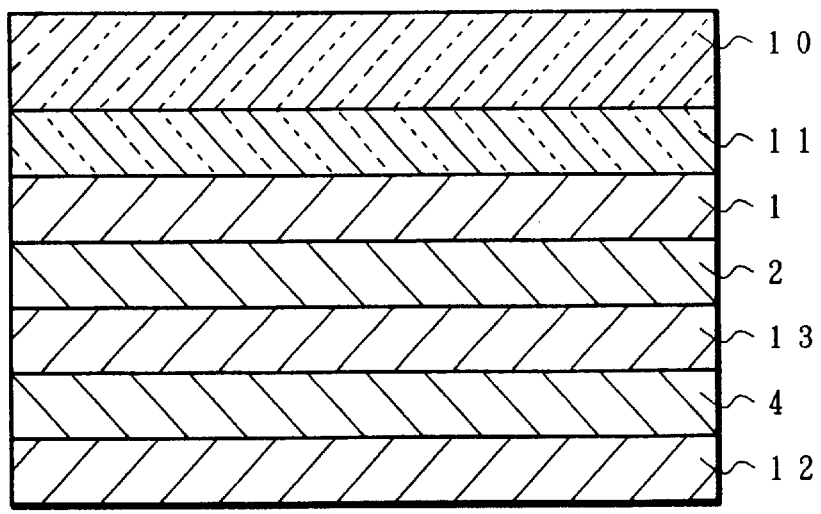
FIG. 8 is a schematic cross-sectional view showing the arrangement of a magneto-optical disk that is an application of the magneto-optical storage medium shown in FIG. 7.

As shown in FIG. 8, the magneto-optical disk includes a transparent dielectric protective layer 11, a reproduction layer 1, a supplementary reproduction layer 2, an in-plane magnetization layer 13, a storage layer 4, and a protective layer 12, all the layers being sequentially stacked on a substrate 10. It should be noted that the same materials as in the first embodiment can be used for the substrate 10, the transparent dielectric protective layer 11, the reproduction layer 1, the supplementary reproduction layer 2, the storage layer 4, and the protective layer 12.

The in-plane magnetization layer 13 is an in-plane magnetization film having a Curie temperature Tc13 approximating the transition temperature Tp2 at which the supplementary reproduction layer 2 changes from an in-plane magnetization state to a perpendicular magnetization state. The in-plane magnetization layer 13 may be fabricated from an in-plane magnetization film made of a material such as GdFe, GdFeCo, GdDyFe, GdDyFeCo, GdNdFe, GdNdFeCo, NdFe, or NdFeCo. A metal element, such as Ta, Cr, Ti, Al, and Si, may be added to the material to adjust the Curie temperature Tc13.

The thickness of the in-plane magnetization layer 13 is preferably not less than 20 nm and not more than 40 nm. If the in-plane magnetization layer 13 is less than 20 nm thick, the exchange forces arising from the storage layer 4 pose an obstacle in maintaining the in-plane magnetization state of the in-plane magnetization layer 13 in a stable manner, degrading the reproduction resolution. If the in-plane magnetization layer is more than 40 nm thick, the increased distance by which the supplementary reproduction layer 2 is separated from the storage layer 4 weakens the magnetostatic coupling forces between the supplementary reproduction layer 2 and the storage layer 4, and poses an obstacle in achieving stable magnetic domain duplication from the storage layer 4 to the supplementary reproduction layer 2.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 4 by deposition, the supplementary storage layer being made of a perpendicular magnetization film, containing, for example, GdFeCo, GdTbFeCo, or GdDyFeCo, that has smaller coercive forces than those of the storage layer 4 and a higher Curie temperature than that of the storage layer 4.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 8.

First, a polycarbonate substrate 10 formed in a disk shape with guide grooves is placed in a sputtering device provided with an Al target, a first GdFeCo alloy target, a second GdFeCo alloy target, a GdFe alloy target, and a TbFeCo alloy target.

Then, an 80 nm thick, AlN, transparent dielectric protective layer 11 is formed on the substrate 10 in a similar manner to the magneto-optical disk of the first embodiment (see FIG. 3). Subsequently, a 30 nm thick, $Gd_{0.29}(Fe_{0.88}Co_{0.12})_{0.71}$, reproduction layer 1 is formed on the transparent dielectric protective layer 11, followed by formation of a 30 nm thick, $Gd_{0.33}(Fe_{0.78}Co_{0.22})_{0.67}$, supplementary reproduction layer 2 on the reproduction layer 1.

Secondly, electric power is continuously supplied to the GdFe alloy target so as to form a 30 nm thick, $Gd_{0.13}Fe_{0.87}$, in-plane magnetization layer 13 on the supplementary reproduction layer 2 at a gas pressure of $4 \times 10^{-3}$ Torr. It should be noted that the resultant in-plane magnetization layer 13 was an in-plane magnetization film having a Curie temperature Tc13 of 160° C. and exhibiting an in-plane magnetization from room temperature to the Curie temperature Tc13.

Thirdly, following a similar procedure as that for the magneto-optical disk mentioned earlier in the first embodiment (see FIG. 3), a 60 nm thick, $Tb_{0.25}(Fe_{0.84}Co_{0.16})_{0.75}$, storage layer 4 is formed on the in-plane magnetization layer 13, followed by formation of a 20 nm thick, AlN, protective layer 12 on the storage layer 4.

(2) Playback Properties

The following description will explain playback properties of a magneto-optical disk (denoted as sample #2). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 6.8 mW was continuously projected while applying a recording magnetic field that was modulated at ±15 kA/m, so as to form a repetitive pattern of upward and downward magnetizations in the storage layer 4 in accordance with the direction of the recording magnetic field. Then, by altering the modulation frequency of the recording magnetic field, a magnetic domain pattern was recorded with mark lengths varying from 0.2 to 0.5 μm. Here, the mark length is equal to the length of the magnetic recording domain and also equal to half the pitch between two adjacent magnetic recording domains.

Figure 9:
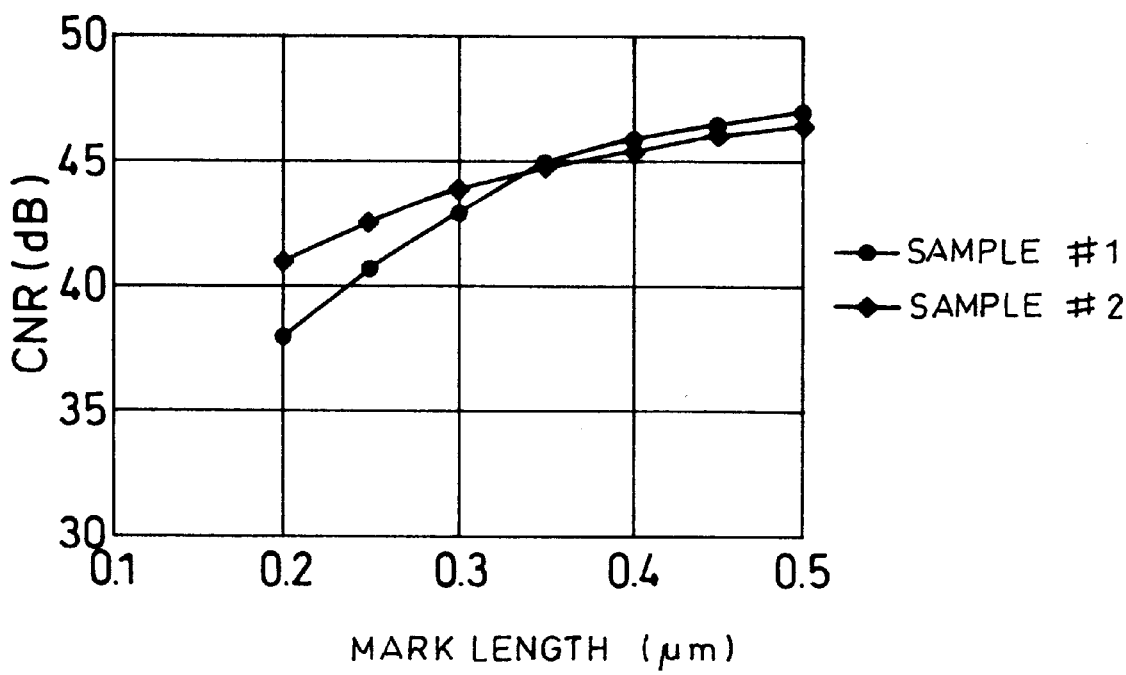
FIG. 9 is a graph showing the mark length dependency of the signal-to-noise ratio of the magneto-optical disk shown in FIG. 8.

FIG. 9 is a graph showing the mark length dependency of the CNR (signal-to-noise ratio) of sample #2, measured by continuously projecting a playback laser of 2.9 mW. For comparison, FIG. 9 also shows, as a graph, the mark length dependency of the CNR of sample #1, which is the magneto-optical disk mentioned earlier in the first embodiment (see FIG. 3) where a non-magnetic intermediate layer 3 is provided in place of the in-plane magnetization layer 13 of sample #2.

Referring to FIG. 9, a comparison of CNR between sample #2 and sample #1 shows that sample #1 has slightly higher CNR values at larger mark lengths (ex. at 0.5 μm); at smaller mark lengths, sample #2 has higher CNR values than sample #1 (ex. about 3 dB higher at 0.2 μm). This is a result of improved reproduction resolution and ensuing satisfactory reproduction signal quality at smaller mark lengths, achieved by the provision of the in-plane magnetization layer 13 in sample #2.

Hence, it would be understood from the comparison that sample #2 of the present embodiment is a magneto-optical disk that exhibits more satisfactory reproduction signal quality than sample #1.

As described above, the magneto-optical storage medium of the present embodiment includes, at least:

a reproduction layer 1 exhibiting an in-plane magnetization state at room temperature and changing to a perpendicular magnetization state at a transition temperature Tp1;

a supplementary reproduction layer 2 exhibiting an in-plane magnetization state at room temperature and changing to a perpendicular magnetization state at a transition temperature Tp2;

an in-plane magnetization layer 13 made of an in-plane magnetization film; and a storage layer 4 made of a perpendicular magnetization film, the layers being deposited in this order, the magneto-optical storage medium being arranged so as to satisfy:

$$Tp1 < Tp2,$$

and $$Tc13 \leq Tp2$$

where Tc13 is the Curie temperature of the in-plane magnetization layer 13.

This arrangement enables the magneto-optical storage medium to amplify the magnetic information stored in the storage layer 4 and duplicate it to the reproduction layer 1, and signals whose cycle is equal to, or below, diffraction limits of light to be reproduced from the storage layer 4 without reducing the amplitude. Further, the provision of the in-plane magnetization layer 13 enables the magneto-optical storage medium to achieve even higher reproduction resolution.

Further, as to the magneto-optical storage medium of the present embodiment, the magnetic properties of the reproduction layer 1, the supplementary reproduction layer 2, and the storage layer 4 are adjusted so that the magnetostatic coupling forces between the storage layer 4 and the supplementary reproduction layer 2 at the transition temperature Tp2 are stronger than the magnetostatic coupling forces between the storage layer 4 and the reproduction layer 1 at the transition temperature Tp1.

These adjustments optimize the magnetostatic coupling state between the storage layer 4 and the reproduction layer 1 and the magnetostatic coupling state between the storage layer 4 and the supplementary reproduction layer 2, enabling the magneto-optical storage medium to perform stable magnetic domain duplication and magnetic domain expansion reproduction.

[Embodiment 3]

Referring to FIG. 10 through FIG. 13, the following description will explain a further embodiment in accordance with the present invention. Here, for convenience, members of the present embodiment that have the same arrangement and function as members of any of the previous embodiments, and that are mentioned in any of the previous embodiments are indicated by the same reference numerals and description thereof is omitted.

Figure 11:
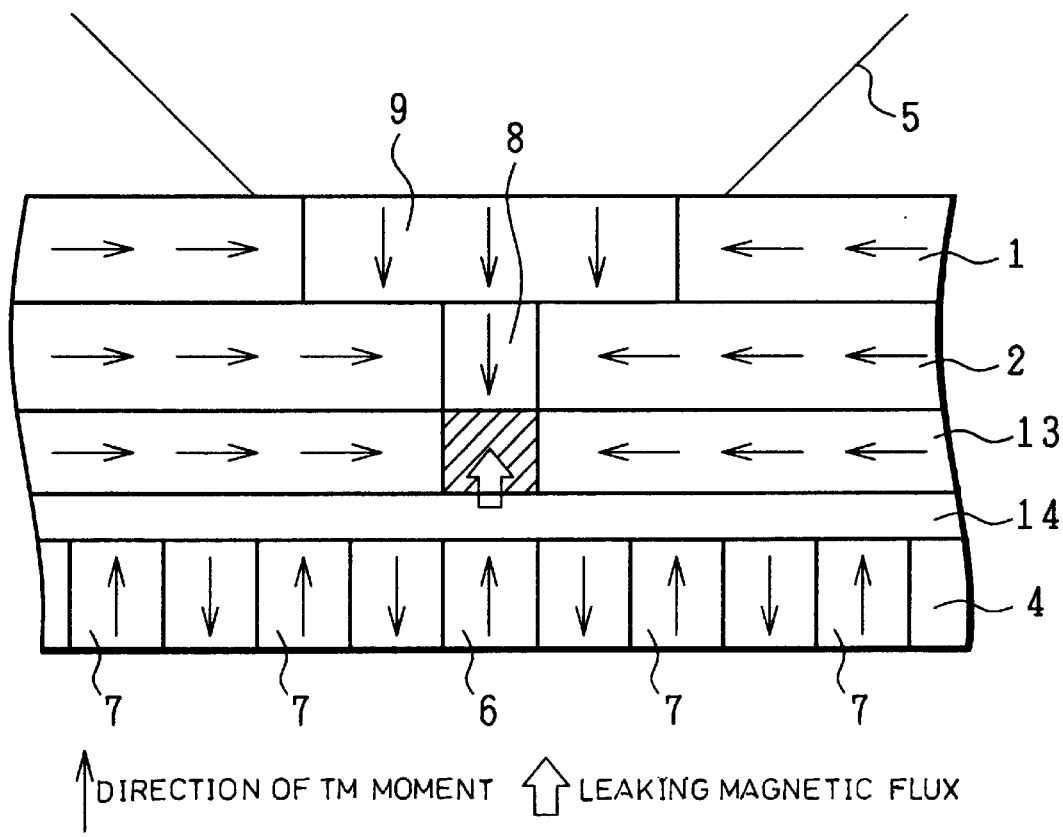
FIG. 11 is a schematic cross-sectional view showing a magnetization state of a magneto-optical storage medium of even another embodiment in accordance with the present invention during reproduction.

As shown in FIG. 11, the magneto-optical storage medium of the present embodiment is arranged further from the magneto-optical storage medium mentioned earlier in the second embodiment (see FIG. 7), so as to include a non-magnetic intermediate layer 14 interposed between the in-plane magnetization layer 13 and the storage layer 4.

Figure 10:
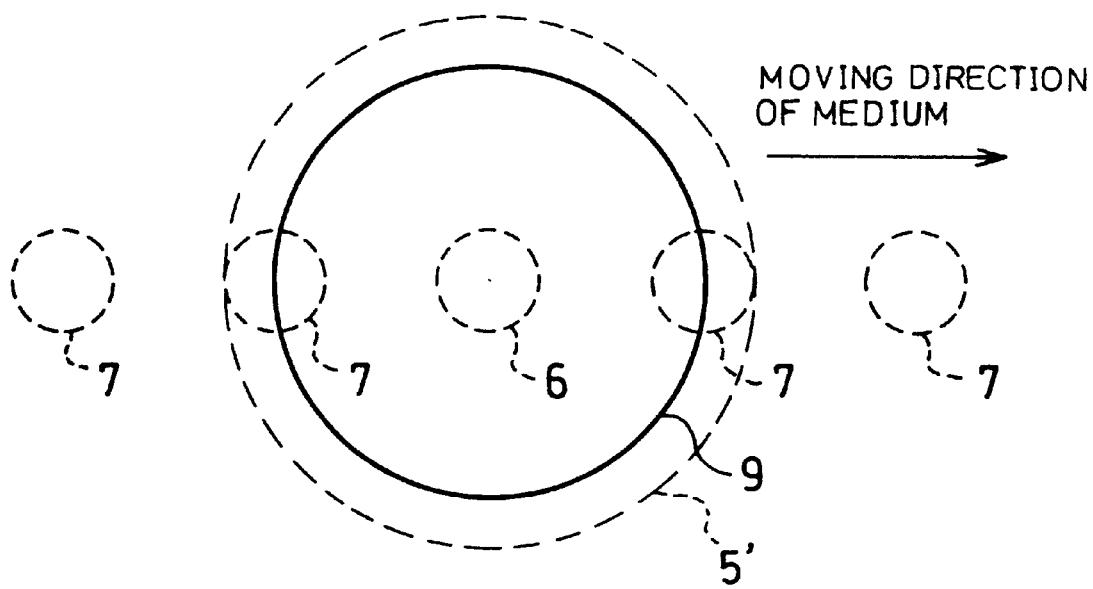
FIG. 10 is a schematic plan view showing a magnetization state of the magneto-optical storage medium shown in FIG. 11 during reproduction.

First of all, referring to FIG. 10 and FIG. 11, principals in reproduction of the magneto-optical storage medium of the present embodiment will be explained. FIG. 10 and FIG. 11 are plan and cross-sectional views, respectively, schematically illustrating a magnetization state of the magneto-optical storage medium during reproduction.

As shown in FIG. 11, the magneto-optical storage medium of the present embodiment is arranged from sequentially stacked layers including a reproduction layer 1, a supplementary reproduction layer 2, an in-plane magnetization layer 13, a non-magnetic intermediate layer 14, and a storage layer 4. It should be noted with regard to the arrows in FIG. 11 that the black ones denote the directions of the magnetization moments of transition metals (TMs), and the outlined one denotes the direction of a leakage magnetic flux.

The non-magnetic intermediate layer 14 is made from a non-magnetic material, and interposed between the in-plane magnetization layer 13 and the storage layer 4 to break exchange coupling between the in-plane magnetization layer 13 and the storage layer 4.

As shown in FIG. 10 and FIG. 11, upon heating the magneto-optical storage medium using a light beam 5 (light beam spot 5'), the magnetic recording domain 6 formed in the storage layer 4 is duplicated to the supplementary reproduction layer 2 by magnetostatic coupling, the magnetic domain 8 formed in the supplementary reproduction layer 2 through the duplication is in turn expanded and duplicated to the reproduction layer 1, and the magnetic domain 9 formed in the reproduction layer 1 through the expansion duplication is reproduced. The principals in reproduction are basically the same as those mentioned earlier in the second embodiment.

Difference, however, lies where in the present embodiment the non-magnetic intermediate layer 14 is interposed between the storage layer 4 and the in-plane magnetization layer 13 whose Curie temperature Tc13(Tc) approximates the transition temperature Tp2 at which the supplementary reproduction layer 2 changes from an in-plane magnetization state to a perpendicular magnetization state, breaking exchange coupling between the in-plane magnetization layer 13 and the storage layer 4. Hence, use of a thinner in-plane magnetization layer 13 still produces effects similar to those mentioned earlier in the second embodiment.

In other words, in the magneto-optical storage medium, the provision of the non-magnetic intermediate layer 14 stabilizes the in-plane magnetization state of the supplementary reproduction layer 2; therefore, even when the in-plane magnetization layer 13 is thin, the storage layer 4 and the supplementary reproduction layer 2 are coupled firmly with each other through magnetostatic forces only where the layers 4 and 2 are heated, enabling the supplementary reproduction layer 2 to produce an improved reproduction resolution.

In this manner, in the magneto-optical storage medium, the magnetic domain 8 formed in the supplementary reproduction layer 2 through duplication at higher reproduction resolution is expanded and duplicated to the reproduction layer 1; thereby a higher reproduction resolution and more satisfactory reproduction signal quality are obtainable. Therefore, with the magneto-optical storage medium, satisfactory reproduction signal quality can be obtained even at small mark lengths by improving the reproduction resolution produced by the supplementary reproduction layer 2, while maintaining satisfactory playback sensitivity.

Next, a magneto-optical disk that is an application of the magneto-optical storage medium will be explained.

Figure 12:
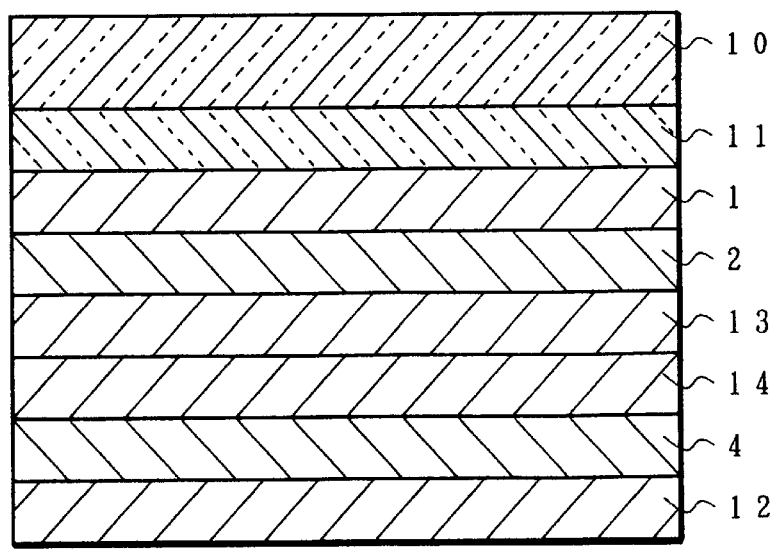
FIG. 12 is a schematic cross-sectional view showing the arrangement of a magneto-optical disk that is an application of the magneto-optical storage medium shown in FIG. 11.

As shown in FIG. 12, the magneto-optical disk includes a transparent dielectric protective layer 11, a reproduction layer 1, a supplementary reproduction layer 2, an in-plane magnetization layer 13, a non-magnetic intermediate layer 14, a storage layer 4, and a protective layer 12, all the layers being sequentially stacked on a substrate 10. It should be noted that the same materials as in the second embodiment can be used for the substrate 10, the transparent dielectric protective layer 11, the reproduction layer 1, the supplementary reproduction layer 2, the in-plane magnetization layer 13, the storage layer 4, and the protective layer 12.

However, in the present embodiment, since the non-magnetic intermediate layer 14 breaks exchange coupling between the in-plane magnetization layer 13 and the storage layer 4, the thickness of the in-plane magnetization layer 13 may be smaller than that of the magneto-optical disk mentioned earlier in the second embodiment (see FIG. 8). Specifically, the thickness of the in-plane magnetization layer 13 is preferably specified not less than 5 nm. If the in-plane magnetization layer 13 is less than 5 nm, the in-plane magnetization layer 13 is too thin to function properly to retain the supplementary reproduction layer 2 in an in-plane magnetization state where the layer 2 is not heated, failing to improve reproduction resolution.

The non-magnetic intermediate layer 14 is formed to break exchange coupling between the storage layer 4 and the in-plane magnetization layer 13, and may be fabricated from a non-magnetic metal, such as Al, Si, Ta, Ti, Au, or Cu, or a non-magnetic alloy of these non-magnetic metals. In addition, AlN, SiN, AlSiN, and other non-magnetic dielectric may be used.

The thickness of the non-magnetic intermediate layer 14 is preferably specified not less than 0.5 nm. If the non-magnetic intermediate layer 14 is less than 0.5 nm, the non-magnetic intermediate layer 14 cannot be formed in a uniform manner, failing to completely break exchange coupling between the storage layer 4 and the in-plane magnetization layer 13.

Moreover, the sum total of the thicknesses of the in-plane magnetization layer 13 and non-magnetic intermediate layer 14 is preferably specified not more than 40 nm. If the sum total of the thicknesses exceeds 40 nm, the increased distance by which the supplementary reproduction layer 2 is separated from the storage layer 4 weakens the magnetostatic coupling forces between the supplementary reproduction layer 2 and the storage layer 4. This poses an obstacle in achieving stable magnetic domain duplication from the storage layer 4 to the supplementary reproduction layer 2, and degrades reproduction signal quality.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 4 by deposition, the supplementary storage layer being made of a perpendicular magnetization film, containing, for example, GdFeCo, GdTbFeCo, or GdDyFeCo, that has smaller coercive forces than those of the storage layer 4 and a higher Curie temperature than that of the storage layer 4.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 12.

First, a polycarbonate substrate 10 formed in a disk shape with guide grooves is placed in a sputtering device provided with an AlSi target, a first GdFeCo alloy target, a second GdFeCo alloy target, a GdFe alloy target, and a TbFeCo alloy target.

Then, an 80 nm thick, AlSiN, transparent dielectric protective layer 11 is formed on the substrate 10 in a similar manner to the magneto-optical disk of the second embodiment (see FIG. 8). Subsequently, a 30 nm thick, $Gd_{0.29}(Fe_{0.88}Co_{0.12})_{0.71}$, reproduction layer 1 is formed on the transparent dielectric protective layer 11, followed by formation of a 30 nm thick, $Gd_{0.33}(Fe_{0.78}Co_{0.22})_{0.67}$, supplementary reproduction layer 2 on the reproduction layer 1. Further, a 15 nm thick, $Gd_{0.13}Fe_{0.87}$, in-plane magnetization layer 13 is formed on the supplementary reproduction layer 2. It should be noted that the resultant in-plane magnetization layer 13 was an in-plane magnetization film having a Curie temperature Tc13 of 160° C. and exhibiting an in-plane magnetization from room temperature to the Curie temperature Tc13.

Secondly, electric power is continuously supplied to the AlSi alloy target so as to form a 1 nm thick, AlSi, non-magnetic intermediate layer 14 on the in-plane magnetization layer 13 at a gas pressure of $4 \times 10^{-3}$ Torr.

Thirdly, following a similar procedure as that for the magneto-optical disk mentioned earlier in the second embodiment (see FIG. 3), a 60 nm thick, $Tb_{0.25}(Fe_{0.84}Co_{0.16})_{0.75}$, storage layer 4 is formed on the non-magnetic intermediate layer 14, followed by formation of a 20 nm thick, AlSiN, protective layer 12 on the storage layer 4.

(2) Playback Properties

The following description will explain playback properties of a magneto-optical disk (denoted as sample #3). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 6.4 mW was continuously projected while applying a recording magnetic field that was modulated at ±15 kA/m, so as to form a repetitive pattern of upward and downward magnetizations in the storage layer 4 in accordance with the direction of the recording magnetic field. Then, by altering the modulation frequency of the recording magnetic field, a magnetic domain pattern was recorded with mark lengths varying from 0.2 to 0.5 µm. Here, the mark length is equal to the length of the magnetic recording domain and also equal to half the pitch between two adjacent magnetic recording domains.

Figure 13:
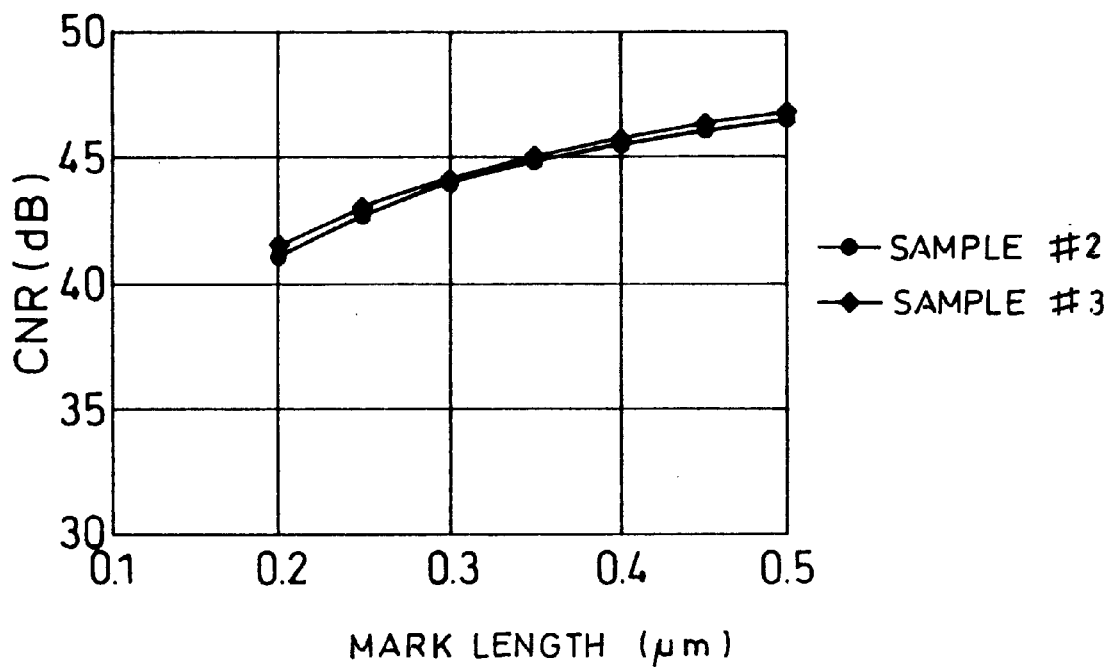
FIG. 13 is graph showing the mark length dependency of the signal-to-noise ratio of the magneto-optical disk shown in FIG. 12.

FIG. 13 is a graph showing the mark length dependency of the CNR (signal-to-noise ratio) of sample #3, measured by continuously projecting a playback laser of 2.7 mW. For comparison, FIG. 13 also shows, as a graph, the mark length dependency of the CNR of sample #2, which is the magneto-optical disk mentioned earlier in the second embodiment (see FIG. 7) where, unlike in sample #3, no non-magnetic intermediate layer 14 is provided and the in-plane magnetization layer 13 is relatively thick.

Referring to FIG. 13, a comparison of CNR between sample #3 and sample #2 shows that similar levels in CNR were obtained; namely, in sample #3, even if the in-plane magnetization layer 13 used was thinner than that in sample #2, the provision of the non-magnetic intermediate layer 14 improved reproduction resolution and produced satisfactory reproduction signal quality at relatively small mark lengths.

Hence, sample #3 of the present embodiment is a magneto-optical disk that can produce satisfactory reproduction signal quality even when a relatively thin in-plane magnetization layer 13 is employed.

As described above, the magneto-optical storage medium of the present embodiment includes, at least:

a reproduction layer 1 exhibiting an in-plane magnetization state at room temperature and changing to a perpendicular magnetization state at a transition temperature Tp1;

a supplementary reproduction layer 2 exhibiting an in-plane magnetization state at room temperature and changing to a perpendicular magnetization state at a transition temperature Tp2;

an in-plane magnetization layer 13 made of an in-plane magnetization film;

a non-magnetic intermediate layer 14; and a storage layer 4 made of a perpendicular magnetization film, the layers being deposited in this order, the magneto-optical storage medium being arranged so as to satisfy:

$$Tp1 < Tp2,$$

and $$Tc13 \leq Tp2$$

where Tc13 is the Curie temperature of the in-plane magnetization layer 13.

This arrangement enables the magneto-optical storage medium to amplify the magnetic information stored in the storage layer 4 and duplicate it to the reproduction layer 1, and signals whose cycle is equal to, or below, diffraction limits of light to be reproduced from the storage layer 4 without reducing the amplitude. Further, the provision of the in-plane magnetization layer 13 enables the magneto-optical storage medium to achieve even higher reproduction resolution. In addition, the non-magnetic intermediate layer 14, by breaking exchange coupling between the in-plane magnetization layer 13 and the storage layer 4, allows use of a thinner in-plane magnetization layer 13 and reduction in recording power and reproduction power.

Further, as to the magneto-optical storage medium of the present embodiment, the magnetic properties of the reproduction layer 1, the supplementary reproduction layer 2, and the storage layer 4 are adjusted so that the magnetostatic coupling forces between the storage layer 4 and the supplementary reproduction layer 2 at the transition temperature Tp2 are stronger than the magnetostatic coupling forces between the storage layer 4 and the reproduction layer 1 at the transition temperature Tp1.

These adjustments optimize the magnetostatic coupling state between the storage layer 4 and the reproduction layer 1 and the magnetostatic coupling state between the storage layer 4 and the supplementary reproduction layer 2, enabling the magneto-optical storage medium to perform stable magnetic domain duplication and magnetic domain expansion reproduction.

[Embodiment 4]

Referring to FIG. 14 through FIG. 19, the following description will explain even another embodiment in accordance with the present invention. Here, for convenience, members of the present embodiment that have the same arrangement and function as members of any of the previous embodiments, and that are mentioned in any of the previous embodiments are indicated by the same reference numerals and description thereof is omitted.

Figure 15:
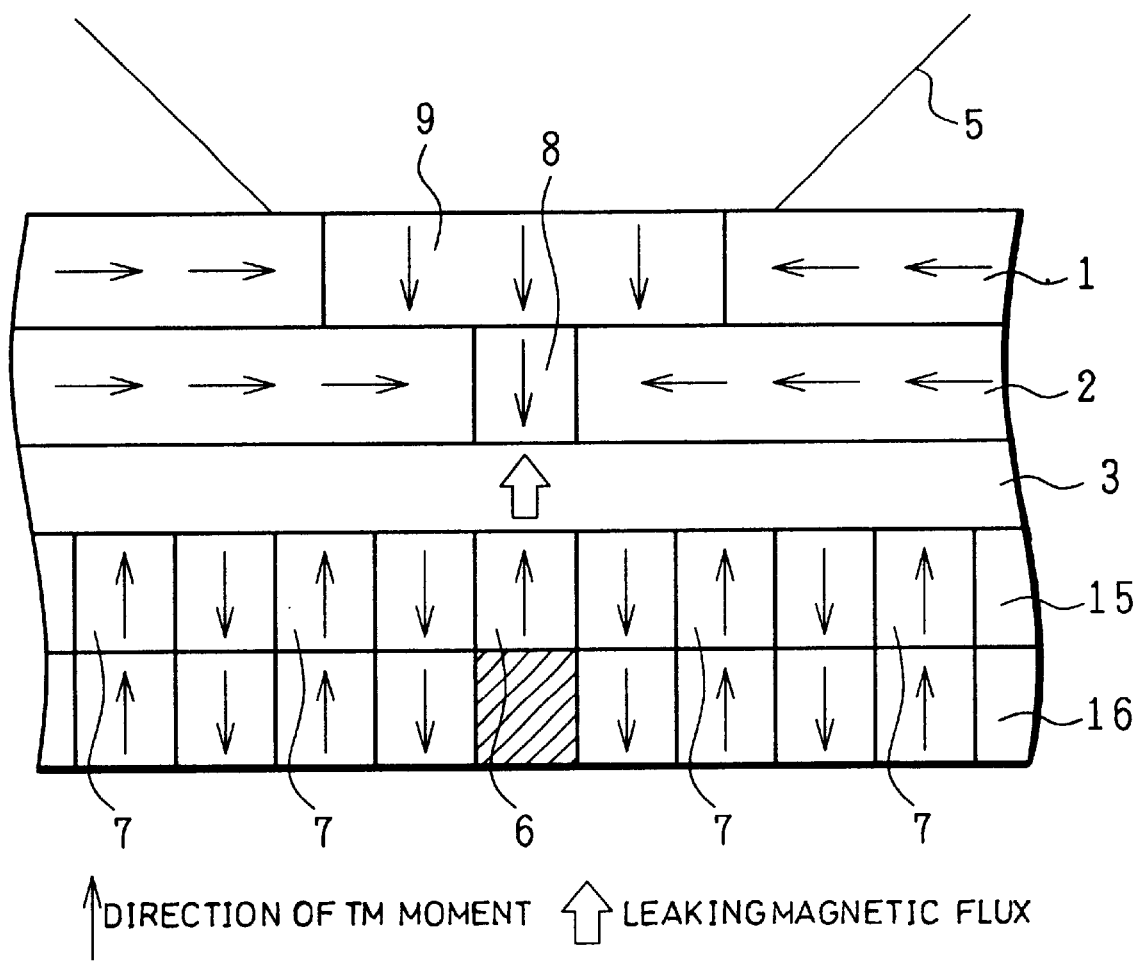
FIG. 15 is a schematic cross-sectional view showing a magnetization state of a magneto-optical storage medium of still another embodiment in accordance with the present invention during reproduction.

As shown in FIG. 15, the magneto-optical storage medium of the present embodiment is arranged so as to include a storage layer 15 and a magnetic flux adjusting layer 16 that exhibit mutually different magnetic properties, in place of the storage layer 4 of the magneto-optical storage medium mentioned earlier in the first embodiment (see FIG. 2).

Figure 14:
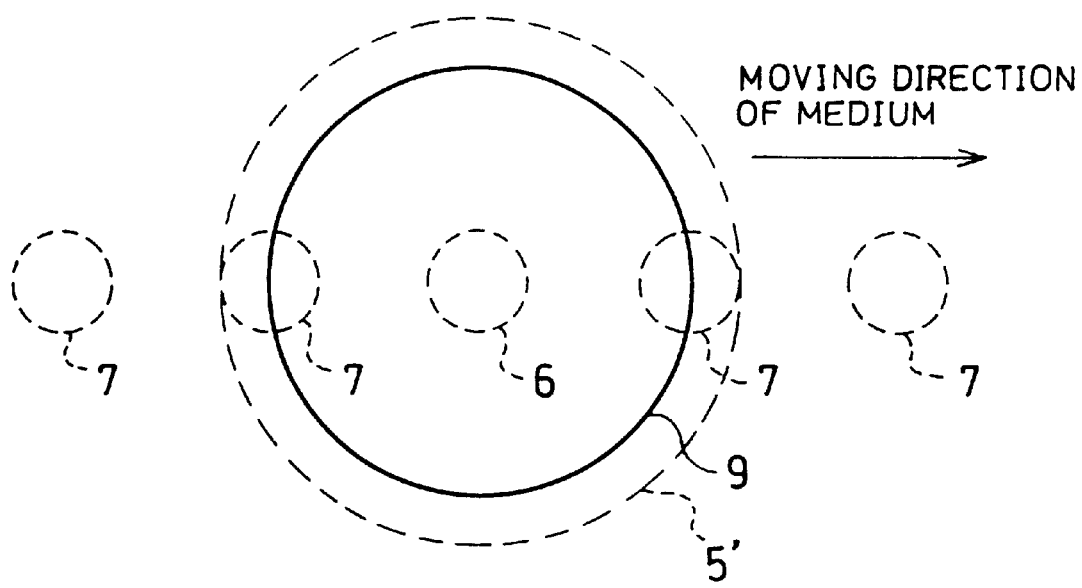
FIG. 14 is a schematic plan view showing a magnetization state of the magneto-optical storage medium shown in FIG. 15 during reproduction.
Figure 16:
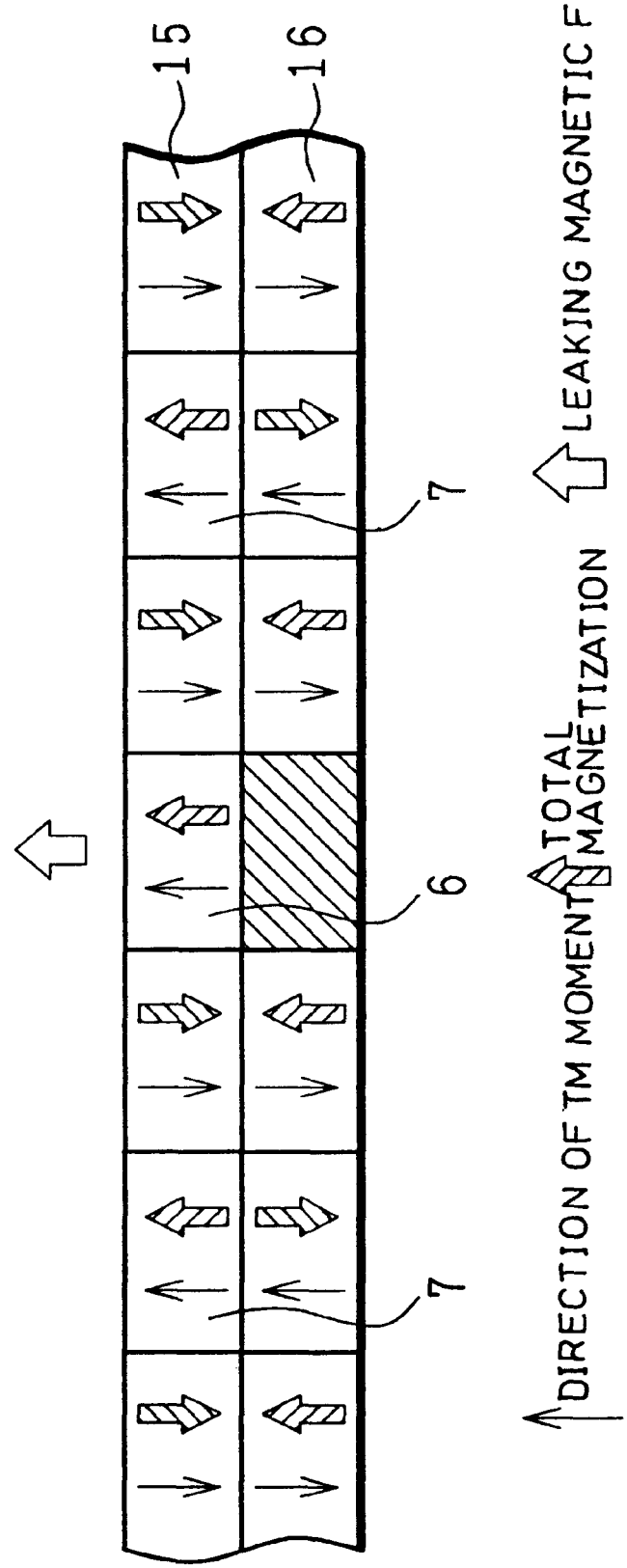
FIG. 16 is a schematic cross-sectional view showing a magnetization state in a primary part of the magneto-optical storage medium shown in FIG. 15 during reproduction.

First of all, referring to FIG. 14 through FIG. 16, principals in reproduction of the magneto-optical storage medium of the present embodiment will be explained. FIG. 14 and FIG. 15 are plan and cross-sectional views, respectively, schematically illustrating a magnetization state of the magneto-optical storage medium during reproduction. FIG. 16 is an enlarged view schematically illustrating a magnetization state of only the storage layer 15 and the magnetic flux adjusting layer 16 shown in FIG. 15 during reproduction.

As shown in FIG. 15, the magneto-optical storage medium of the present embodiment is arranged from sequentially stacked layers including a reproduction layer 1, a supplementary reproduction layer 2, a non-magnetic intermediate layer 3, a storage layer 15, and a magnetic flux adjusting layer 16. It should be noted with regard to the arrows in FIG. 15 that the black ones denote the directions of the magnetization moments of transition metals (TMs), and the outlined one denotes the direction of a leakage magnetic flux.

It should be noted that in the present embodiment the storage layer 15 and the magnetic flux adjusting layer 16 only need to have mutually different magnetic polarities; there are no restrictions on the sequence in which the storage layer 15 and the magnetic flux adjusting layer 16 are stacked; they may be stacked in the reverse sequence from that shown in FIG. 15.

The storage layer 15 is a TM rich perpendicular magnetization film. Meanwhile, the magnetic flux adjusting layer 16 is an RE rich perpendicular magnetization film, and is deposited adjacent to the storage layer 15. The magnetic flux adjusting layer 16 is specified to exhibit a different magnetic polarity from the storage layer 15, and to have a lower Curie temperature Tc16 than the Curie temperature Tc15 of the storage layer 15.

During reproduction, the magneto-optical storage medium is heated using a light beam 5 that is converged at the magnetic recording domain 6 and its surround area, causing the storage layer 15 and the magnetic flux adjusting layer 16 to exhibit a magnetization state shown in FIG. 16. It should be noted with regard to the arrows in FIG. 16, the thin ones denote the directions of the magnetization moments of transition metals (TMs), the thick ones denote the directions of the total magnetizations, and the outlined one denotes the direction of a leakage magnetic flux.

Here, the storage layer 15 is a TM rich perpendicular magnetization film, and exhibits an TM moment and a total magnetization that are parallel to each other throughout the temperature range from room temperature to its Curie temperature Tc15. Meanwhile, the magnetic flux adjusting layer 16 is an RE rich perpendicular magnetization film, and exhibits an TM moment and a total magnetization that are antiparallel throughout the temperature range from room temperature to its Curie temperature Tc16.

Due to the stacking of the storage layer 15 and the magnetic flux adjusting layer 16 having those properties mentioned above, as shown in FIG. 16 illustrating the magnetic domain 7, exchange forces arise from the storage layer 15 and the magnetic flux adjusting layer 16 and serve so as to align the TM moments of the two layers in parallel. Here, the total magnetization of the storage layer 15 is antiparallel to that of the magnetic flux adjusting layer 16. As a result, the total magnetization of the storage layer 15 offsets that of the magnetic flux adjusting layer 16, reducing the leakage magnetic flux, which is the sum of the total magnetizations of the two layers, down to substantially zero.

In contrast, as shown in FIG. 16 illustrating the magnetic recording domain 6, the magnetic flux adjusting layer 16 loses its total magnetization where the magnetic flux adjusting layer 16 is heated to or higher than the Curie temperature Tc16 (slashed area at the bottom of the magnetic recording domain 6 in FIG. 16); only the storage layer 15 has a total magnetization. Consequently, a leakage magnetic flux arises from the magnetic recording domain 6. Therefore, a large leakage magnetic flux arises from the storage layer 15 only at temperatures (in the duplication temperature range) at which the magnetic information in the storage layer 15 is duplicated to the supplementary reproduction layer 2.

More specifically, as shown in FIG. 14 and FIG. 15, in and below the duplication temperature range, the magneto-optical storage medium restrains the leakage magnetic flux arising from the storage layer 15 and the magnetic flux adjusting layer 16. Upon heating the magneto-optical storage medium using a light beam 5 (light beam spot 5'), a leakage magnetic flux arises only from the magnetic recording domain 6 that is heated up to the duplication temperature range. The resultant leakage magnetic flux duplicates the magnetic information in the storage layer 15 to the supplementary reproduction layer 2. The magnetic domain 8 formed in the supplementary reproduction layer 2 through the duplication is then expanded and form a duplicate magnetic domain 9 in the reproduction layer 1.

Hence, owing to the stacking of the storage layer 15 and the magnetic flux adjusting layer 16 that exhibit mutually different magnetic properties in place of the storage layer 4 (see FIG. 2), the magneto-optical storage medium of the present invention can duplicate magnetic domains from the storage layer 15 to the supplementary reproduction layer 2 at higher reproduction resolution. Therefore, with the magneto-optical storage medium, the magnetic domain expansion reproduction is performed in a stable manner and at higher reproduction resolution.

Next, a magneto-optical disk that is an application of the magneto-optical storage medium will be explained.

Figure 17:
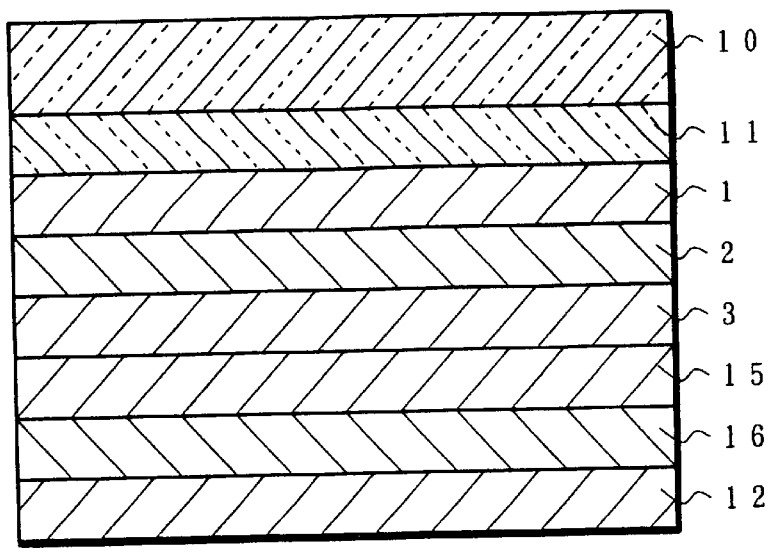
FIG. 17 is a schematic cross-sectional view showing the arrangement of a magneto-optical disk that is an application of the magneto-optical storage medium shown in FIG. 15.

As shown in FIG. 17, the magneto-optical disk includes a transparent dielectric protective layer 11, a reproduction layer 1, a supplementary reproduction layer 2, a non-magnetic intermediate layer 3, a storage layer 15, a magnetic flux adjusting layer 16, and a protective layer 12, all the layers being sequentially stacked on a substrate 10. It should be noted that the same materials as in the first embodiment can be used for the substrate 10, the transparent dielectric protective layer 11, the reproduction layer 1, the supplementary reproduction layer 2, the non-magnetic intermediate layer 3, and the protective layer 12.

The storage layer 15 and the magnetic flux adjusting layer 16 are perpendicular magnetization films made of alloys of rare earth and transition metals, and are specified to exhibit mutually different magnetic polarities. Specifically, if a TM rich perpendicular magnetization film made of an alloy of rare earth and transition metals is used as the storage layer 15, an RE rich perpendicular magnetization film made of an alloy of rare earth and transition metals is used as the magnetic flux adjusting layer 16. Conversely, if an RE rich perpendicular magnetization film made of an alloy of rare earth and transition metals is used as the storage layer 15, a TM rich perpendicular magnetization film made of an alloy of rare earth and transition metals is used as the magnetic flux adjusting layer 16.

The storage layer 15 and the magnetic flux adjusting layer 16 are specified so that the Curie temperature Tc16 of the magnetic flux adjusting layer 16 is lower than the Curie temperature Tc15 of the storage layer 15 to allow a strong leakage magnetic flux to arise from the storage layer 15 only where the storage layer 15 is in the duplication temperature range. It is preferable to specify the Curie temperature Tc16 to be substantially of the same value as the transition temperature Tp2 at which the supplementary reproduction layer 2 changes from an in-plane magnetization state to a perpendicular magnetization state. The specification enables an area of the supplementary reproduction layer 2 where the supplementary reproduction layer 2 exhibits a perpendicular magnetization state to substantially correspond to an area of the storage layer 15 where a leakage magnetic flux arises.

Moreover, preferably, the thickness of the storage layer 15 is specified not less than 30 nm, the thickness of the magnetic flux adjusting layer 16 not less than 10 nm, and the total sum of the thicknesses of the storage layer 15 and the magnetic flux adjusting layer 16 not more than 120 nm. If the storage layer 15 is less than 30 nm thick, a resultant smaller leakage magnetic flux arising from the storage layer 15 poses an obstacle in maintaining a stable magnetostatic coupling state between the supplementary reproduction layer 2 and the storage layer 15, degrading reproduction signal quality. If the magnetic flux adjusting layer 16 is less than 10 nm thick, since adjustment of the leakage magnetic flux arising from the storage layer 15 becomes increasingly insufficient with the reduced thickness of the magnetic flux adjusting layer 16, satisfactory reproduction signal quality is not obtainable at small mark lengths. If the storage layer 15 and the magnetic flux adjusting layer 16, when stacked, are more than 120 nm thick, the increased thickness tangibly degrades recording sensitivity.

A perpendicular magnetization film made of a material, such as TbFe, TbFeCo, DyFe, DyFeCo, TbDyFe, or TbDyFeCo, may be used for the storage layer 15 and the magnetic flux adjusting layer 16 to impart the aforementioned magnetic properties to the layers 15 and 16. A metal element, such as Ta, Cr, Ti, Al, and Si, may be added to the material to improve the resistance of the material against humidity and oxidation.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 15 by deposition, the supplementary storage layer being made of a perpendicular magnetization film, containing, for example, GdFeCo, GdTbFeCo, or GdDyFeCo, that has smaller coercive forces than those of the storage layer 15 and a higher Curie temperature than that of the storage layer 15.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 17.

First, a polycarbonate substrate 10 formed in a disk shape with guide grooves is placed in a sputtering device provided with an Al target, a first GdFeCo alloy target, a second GdFeCo alloy target, a TbFeCo alloy target, and a TbDyFeCo alloy target.

Then, an 80 nm thick, AlN, transparent dielectric protective layer 11 is formed on the substrate 10 in a similar manner to the magneto-optical disk of the first embodiment (see FIG. 3). Subsequently, a 30 nm thick, $Gd_{0.29}(Fe_{0.88}Co_{0.12})_{0.71}$, reproduction layer 1 is formed on the transparent dielectric protective layer 11, followed by formation of a 30 nm thick, $Gd_{0.33}(Fe_{0.78}Co_{0.22})_{0.67}$, supplementary reproduction layer 2 on the reproduction layer 1. Further, a 1 nm thick, Al, non-magnetic intermediate layer 3 is formed on the supplementary reproduction layer 2.

Secondly, electric power is continuously supplied to the TbFeCo alloy target so as to form a 60 nm thick, $Tb_{0.22}(Fe_{0.84}CO_{0.16})_{0.78}$, storage layer 15 on the non-magnetic intermediate layer 3 at a gas pressure of $4\times10^{-3}$ Torr. It should be noted that the resultant storage layer 15 is a TM rich perpendicular magnetization film. Besides, the storage layer 15 is specified to have a compensation temperature of 0° C. and a Curie temperature Tc15 of 280° C., and to exhibit a perpendicular magnetization state throughout the temperature range from room temperature to its Curie temperature Tc15.

Thirdly, electric power is continuously supplied to the TbDyFeCo alloy target to form a 40 nm thick, $(Tb_{0.6}Dy_{0.4})_{0.29}(Fe_{0.86}Co_{0.14})_{0.71}$, magnetic flux adjusting layer 16 on the storage layer 15 at a gas pressure of $4\times10^{-3}$ Torr. It should be noted that the resultant magnetic flux adjusting layer 16 is an RE rich perpendicular magnetization film. Besides, the magnetic flux adjusting layer 16 is specified to have a Curie temperature Tc16 of 160° C., and to exhibit a perpendicular magnetization state throughout the temperature range from room temperature to the Curie temperature Tc16.

Fourthly, a mixed gas of argon and nitrogen is introduced, and electric power is supplied to the Al target, to form a 20 nm thick, AlN, protective layer 12 on the magnetic flux adjusting layer 16 at a gas pressure of $4\times10^{-3}$ Torr.

Now, referring to FIG. 18, the temperature dependency of the total magnetization of the storage layer 15 and the magnetic flux adjusting layer 16 will be explained.

It should be noted that since the storage layer 15 and the magnetic flux adjusting layer 16 exhibit mutually different magnetic polarities, the total moment M15 of the storage layer 15 is antiparallel to the total moment M16 of the magnetic flux adjusting layer 16. Accordingly, the total moment M15 of the storage layer 15 is represented by a positive value, while the total moment M16 of the magnetic flux adjusting layer 16 is represented by a negative value. Moreover, taking the thickness (60 nm) of the storage layer 15 and the thickness (40 nm) of the magnetic flux adjusting layer 16 into account, when the storage layer 15 and the magnetic flux adjusting layer 16 are stacked, the total magnetization Mt is given by the following equation based on the total moment of the two layers:

$$Mt=M15+M16\times(40/60)$$

Figure 18:
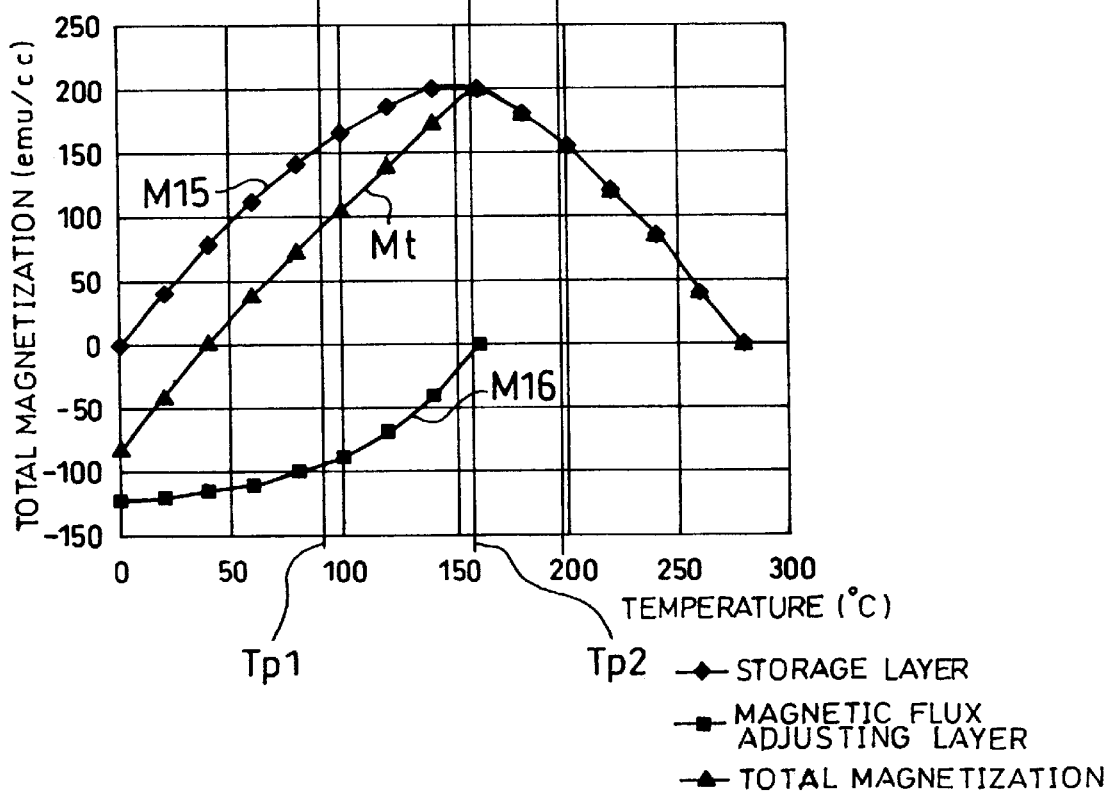
FIG. 18 is a graph showing temperature dependency of the total magnetization of the magneto-optical disk shown in FIG. 17.

As shown in FIG. 18, a comparison between the total moment M15 and the total magnetization Mt reveals that the total magnetization Mt increases with rising temperature more sharply than does the total moment M15, before reaching the duplication temperature range. Accordingly, it would be understood that the provision of the magnetic flux adjusting layer 16 restrains the leakage magnetic flux arising from the storage layer 15 and the magnetic flux adjusting layer 16 and thereby weaken magnetostatic coupling with the supplementary reproduction layer 2 at temperatures below the duplication temperature range, as well as maintains strong magnetostatic coupling between the storage layer 15 and the supplementary reproduction layer 2 in the duplication temperature range.

A leakage magnetic flux, when having such temperature dependency, enables the magnetic information in the storage layer 15 to be duplicated to the supplementary reproduction layer 2 at high reproduction resolution. Further, the magnetic domain duplicated to the supplementary reproduction layer 2 at high reproduction resolution is expanded and duplicated to the reproduction layer 1, which realizes magnetic domain expansion reproduction where the strength of reproduced signals does not deteriorate even at small mark lengths.

(2) Playback Properties

The following description will explain playback properties of a magneto-optical disk (denoted as sample #4). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 6.8 mW was continuously projected while applying a recording magnetic field that was modulated at ±15 kA/m, so as to form a repetitive pattern of upward and downward magnetizations in the storage layer 15 and the magnetic flux adjusting layer 16 in accordance with the direction of the recording magnetic field. Then, by altering the modulation frequency of the recording magnetic field, a magnetic domain pattern was recorded with mark lengths varying from 0.2 to 0.5 µm. Here, the mark length is equal to the length of the magnetic recording domain and also equal to half the pitch between two adjacent magnetic recording domains.

Figure 19:
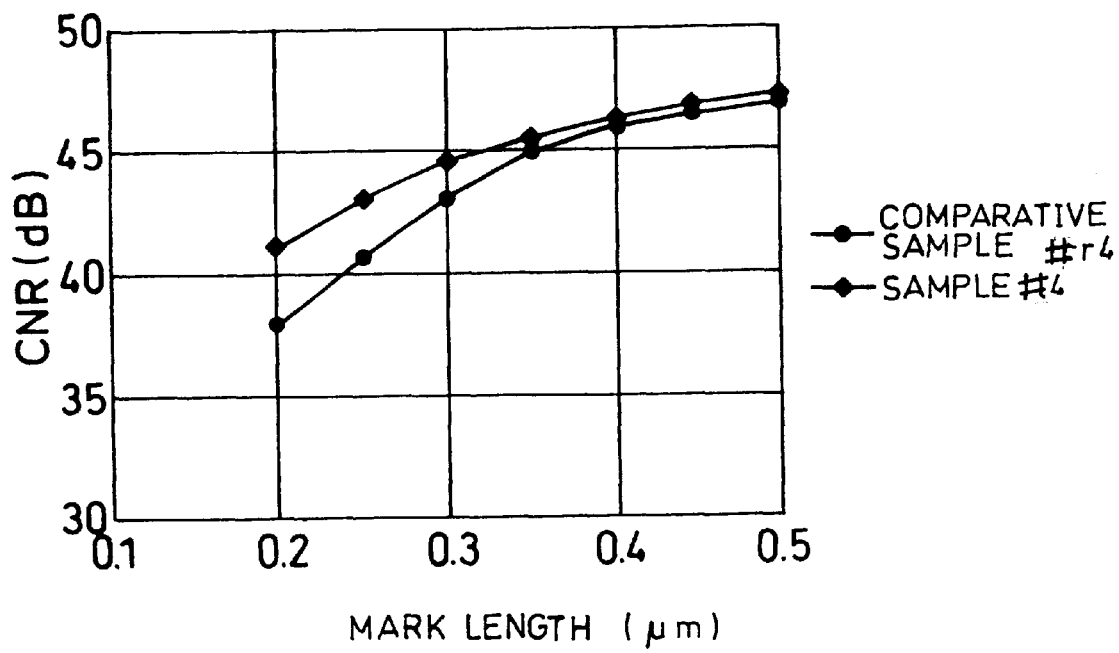
FIG. 19 is a graph showing the mark length dependency of the signal-to-noise ratio of the magneto-optical disk shown in FIG. 17.

FIG. 19 is a graph showing the mark length dependency of the CNR (signal-to-noise ratio) of sample #4, measured by continuously projecting a playback laser of 2.9 mW. For comparison, FIG. 19 also shows, as a graph, the mark length dependency of the CNR of a magneto-optical disk (denoted as comparative sample #r4) having the same arrangement as sample #4 except that no magnetic flux adjusting layer 16 is provided.

Comparative sample #r4 differs from sample #1 mentioned earlier in the first embodiment (see FIG. 3 and FIG. 5) only slightly in magnetic properties of the storage layers. Consequently, comparative sample #r4 exhibits substantially the same level in CNR as sample #1; it is thus verified that the magnetic domain expansion reproduction is achieved with comparative sample #r4 similarly to sample #1. It should be noted that for measurement on comparative sample #r4, laser power was set to 6.2 mW during recording and to 2.6 mW during reproduction.

As shown in FIG. 19, the CNR of sample #4 is higher than that of comparative sample #r4. Especially, at small mark lengths (ex. at 0.2 µm), sample #4 realizes more satisfactory magnetic domain expansion reproduction than comparative sample #r4.

Hence, sample #4 of the present embodiment, since it is provided with the magnetic flux adjusting layer 16, restrains the leakage magnetic flux arising from the storage layer 15 and thereby allows the magnetic information in the storage layer 15 to be duplicated to the supplementary reproduction layer 2 at high reproduction resolution at temperatures below the duplication temperature range, which realizes magnetic domain expansion reproduction where the strength of reproduced signals does not deteriorate even at small mark lengths.

As described above, the magneto-optical storage medium of the present embodiment includes, at least:

a reproduction layer 1 exhibiting an in-plane magnetization state at room temperature and changing to a perpendicular magnetization state at a transition temperature Tp1;

a supplementary reproduction layer 2 exhibiting an in-plane magnetization state at room temperature and changing to a perpendicular magnetization state at a transition temperature Tp2;

a non-magnetic intermediate layer 3;

a storage layer 15 made of a perpendicular magnetization film; and a magnetic flux adjusting layer 16 made of a perpendicular magnetization film that exhibits a different magnetic polarity from the storage layer 15 and that has a Curie temperature Tc16 lower than the Curie temperature Tc15 of the storage layer 15, the layers being deposited in this order, the magneto-optical storage medium being arranged so as to satisfy:

$$Tp1<Tp2$$

This arrangement enables the magneto-optical storage medium to amplify the magnetic information stored in the storage layer 15 and duplicate it to the reproduction layer 1, and signals whose cycle is equal to, or below, diffraction limits of light to be reproduced from the storage layer 15 without reducing the amplitude. Further, the use of the storage layer 15 and the magnetic flux adjusting layer 16, which exhibit mutually different magnetic polarities, allows the magneto-optical storage medium to optimize the leakage magnetic flux. Consequently, the magneto-optical storage medium can be reproduced at a higher resolution.

Further, as to the magneto-optical storage medium of the present embodiment, the magnetic properties of the reproduction layer 1, the supplementary reproduction layer 2, and the storage layer 15 are adjusted so that the magnetostatic coupling forces between the storage layer 15 and the supplementary reproduction layer 2 at the transition temperature Tp2 are stronger than the magnetostatic coupling forces between the storage layer 15 and the reproduction layer 1 at the transition temperature Tp1.

These adjustments optimize the magnetostatic coupling state between the storage layer 15 and the reproduction layer 1 and the magnetostatic coupling state between the storage layer 15 and the supplementary reproduction layer 2, enabling the magneto-optical storage medium to perform stable magnetic domain duplication and magnetic domain expansion reproduction.

[Embodiment 5]

Referring to FIG. 20 through FIG. 23, the following description will explain another embodiment in accordance with the present invention. Here, for convenience, members of the present embodiment that have the same arrangement and function as members of any of the first to fourth embodiments, and that are mentioned in any of those embodiments are indicated by the same reference numerals and description thereof is omitted.

Figure 21:
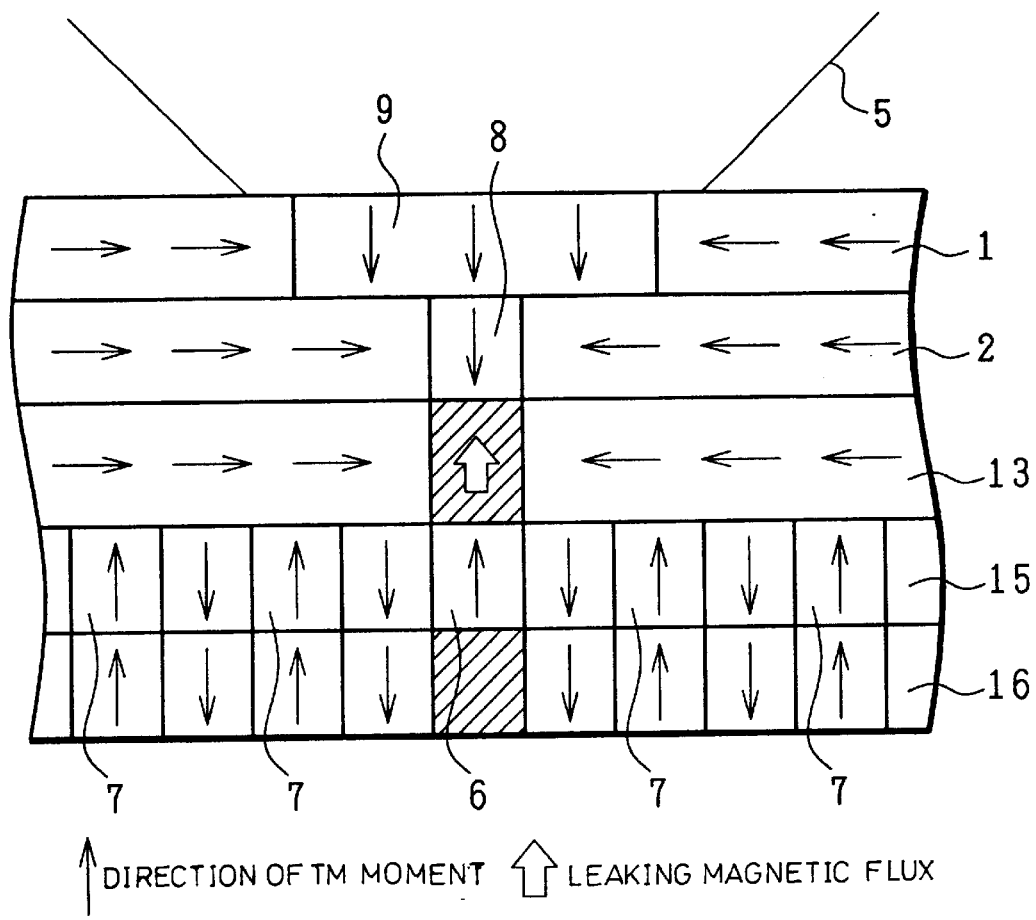
FIG. 21 is a schematic cross-sectional view showing a magnetization state of a magneto-optical storage medium of a further embodiment in accordance with the present invention during reproduction.

As shown in FIG. 21, the magneto-optical storage medium of the present embodiment is arranged similarly to that of the fourth embodiment so as to include a storage layer 15 and a magnetic flux adjusting layer 16 that exhibit mutually different magnetic properties, in place of the storage layer 4 of the magneto-optical storage medium mentioned earlier in the second embodiment (see FIG. 7).

Figure 20:
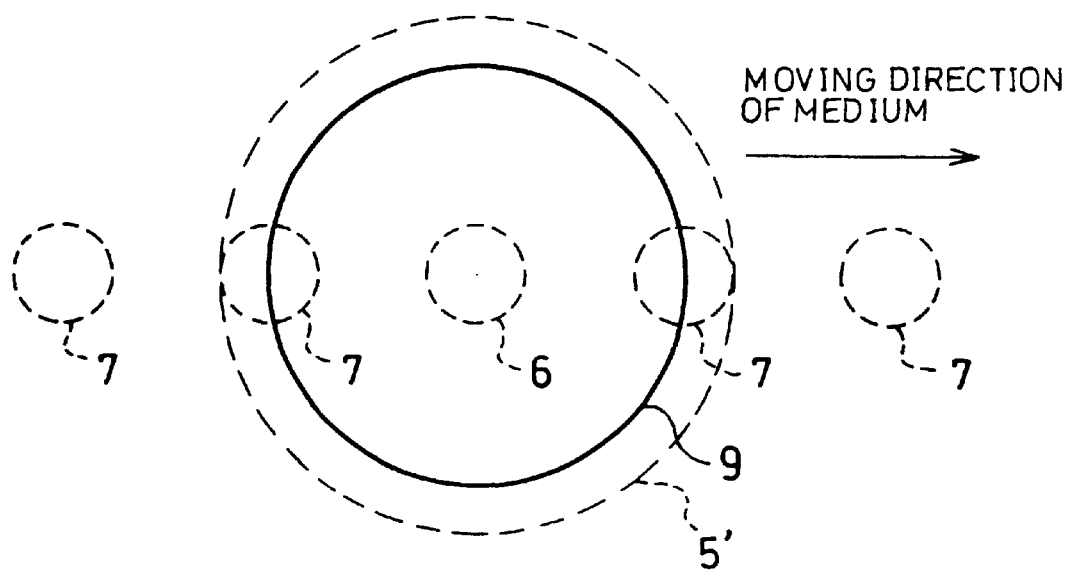
FIG. 20 is a schematic plan view showing a magnetization state of the magneto-optical storage medium shown in FIG. 21 during reproduction.

First of all, referring to FIG. 20 and FIG. 21, principals in reproduction of the magneto-optical storage medium of the present embodiment will be explained. FIG. 20 and FIG. 21 are plan and cross-sectional views, respectively, schematically illustrating a magnetization state of the magneto-optical storage medium during reproduction.

As shown in FIG. 21, the magneto-optical storage medium of the present embodiment is arranged from sequentially stacked layers including a reproduction layer 1, a supplementary reproduction layer 2, an in-plane magnetization layer 13, a storage layer 15, and a magnetic flux adjusting layer 16. It should be noted with regard to the arrows in FIG. 21 that the black ones denote the directions of the magnetization moments of transition metals (TMs), and the outlined one denotes the direction of a leakage magnetic flux.

It should be noted that in the present embodiment the storage layer 15 and the magnetic flux adjusting layer 16 only need to have mutually different magnetic polarities; there are no restrictions on the sequence in which the storage layer 15 and the magnetic flux adjusting layer 16 are stacked; they may be stacked in the reverse sequence from that shown in FIG. 21.

As shown in FIG. 20 and FIG. 21, in and below the duplication temperature range, the magneto-optical storage medium restrains the leakage magnetic flux arising from the storage layer 15 and the magnetic flux adjusting layer 16. Upon heating the magneto-optical storage medium using a light beam 5 (light beam spot 5'), a leakage magnetic flux arises only from the magnetic recording domain 6 that is heated up to the duplication temperature range. Here, a portion, of the in-plane magnetization layer 13, that is adjacent to the magnetic recording domain 6 (slashed area on the top of the magnetic recording domain 6 in FIG. 21) is heated beyond the Curie temperature Tc13 (Tc), and loses magnetization. The resultant leakage magnetic flux duplicates the magnetic information in the storage layer 15 to the supplementary reproduction layer 2. The magnetic domain 8 formed in the supplementary reproduction layer 2 through the duplication is then expanded and form a duplicate magnetic domain 9 in the reproduction layer 1.

Hence, similarly to the magneto-optical storage medium of the fourth embodiment (see FIG. 15), owing to the stacking of the storage layer 15 and the magnetic flux adjusting layer 16 that exhibit mutually different magnetic properties in place of the storage layer 4 mentioned earlier in the second embodiment (see FIG. 7), the magneto-optical storage medium of the present invention can duplicate magnetic domains from the storage layer 15 to the supplementary reproduction layer 2 at higher reproduction resolution. Therefore, with the magneto-optical storage medium, the magnetic domain expansion reproduction is performed in a stable manner and at higher reproduction resolution.

Next, a magneto-optical disk that is an application of the magneto-optical storage medium will be explained.

Figure 22:
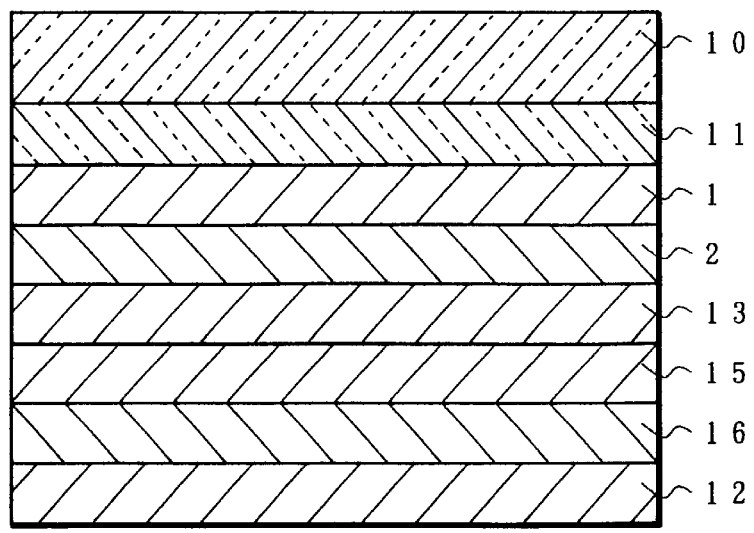
FIG. 22 is a schematic cross-sectional view showing the arrangement of a magneto-optical disk that is an application of the magneto-optical storage medium shown in FIG. 21.

As shown in FIG. 22, the magneto-optical disk includes a transparent dielectric protective layer 11, a reproduction layer 1, a supplementary reproduction layer 2, an in-plane magnetization layer 13, a storage layer 15, a magnetic flux adjusting layer 16, and a protective layer 12, all the layers being sequentially stacked on a substrate 10. It should be noted that the same materials as in the second embodiment can be used for the substrate 10, the transparent dielectric protective layer 11, the reproduction layer 1, the supplementary reproduction layer 2, the in-plane magnetization layer 13, and the protective layer 12. Moreover, the same materials as in the fourth embodiment can be used for the storage layer 15 and the magnetic flux adjusting layer 16.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 15 by deposition, the supplementary storage layer being made of a perpendicular magnetization film, containing, for example, GdFeCo, GdTbFeCo, or GdDyFeCo, that has smaller coercive forces than those of the storage layer 15 and a higher Curie temperature than that of the storage layer 15.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 22.

First, a polycarbonate substrate 10 formed in a disk shape with guide grooves is placed in a sputtering device provided with an Al target, a first GdFeCo alloy target, a second GdFeCo alloy target, a GdFe alloy target, a TbFeCo alloy target, and a TbDyFeCo alloy target.

Secondly, an 80 nm thick, AlN, transparent dielectric protective layer 11 is formed on the substrate 10 in a similar manner to the magneto-optical disk mentioned earlier in the second embodiment (see FIG. 8). Subsequently, a 30 nm thick, $Gd_{0.29}(Fe_{0.88}Co_{0.12})_{0.71}$, reproduction layer 1 is formed on the transparent dielectric protective layer 11, followed by formation of a 30 nm thick, $Gd_{0.33}(Fe_{0.78}Co_{0.22})_{0.67}$, supplementary reproduction layer 2 on the reproduction layer 1. Subsequently, a 30 nm thick, $Gd_{0.13}Fe_{0.87}$, in-plane magnetization layer 13 is formed on the supplementary reproduction layer 2

Thirdly, following a similar procedure as that for the magneto-optical disk mentioned earlier in the fourth embodiment (see FIG. 17), a 60 nm thick, $Tb_{0.22}(Fe_{0.84}Co_{0.16})_{0.78}$, storage layer 15 is formed on the in-plane magnetization layer 13; subsequently, a 40 nm thick, $(Tb_{0.6}Dy_{0.4})_{0.29}(Fe_{0.86}Co_{0.14})_{0.71}$, magnetic flux adjusting layer 16 is formed on the storage layer 15, followed by formation of a 20 nm thick, AlN, protective layer 12 on the magnetic flux adjusting layer 16.

(2) Playback Properties

The following description will explain playback properties of a magneto-optical disk (denoted as sample #5). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 7.4 mW was continuously projected while applying a recording magnetic field that was modulated at ±15 kA/m, so as to form a repetitive pattern of upward and downward magnetizations in the storage layer 15 and the magnetic flux adjusting layer 16 in accordance with the direction of the recording magnetic field. Then, by altering the modulation frequency of the recording magnetic field, a magnetic domain pattern was recorded with mark lengths varying from 0.2 to 0.5 μm. Here, the mark length is equal to the length of the magnetic recording domain and also equal to half the pitch between two adjacent magnetic recording domains.

Figure 23:
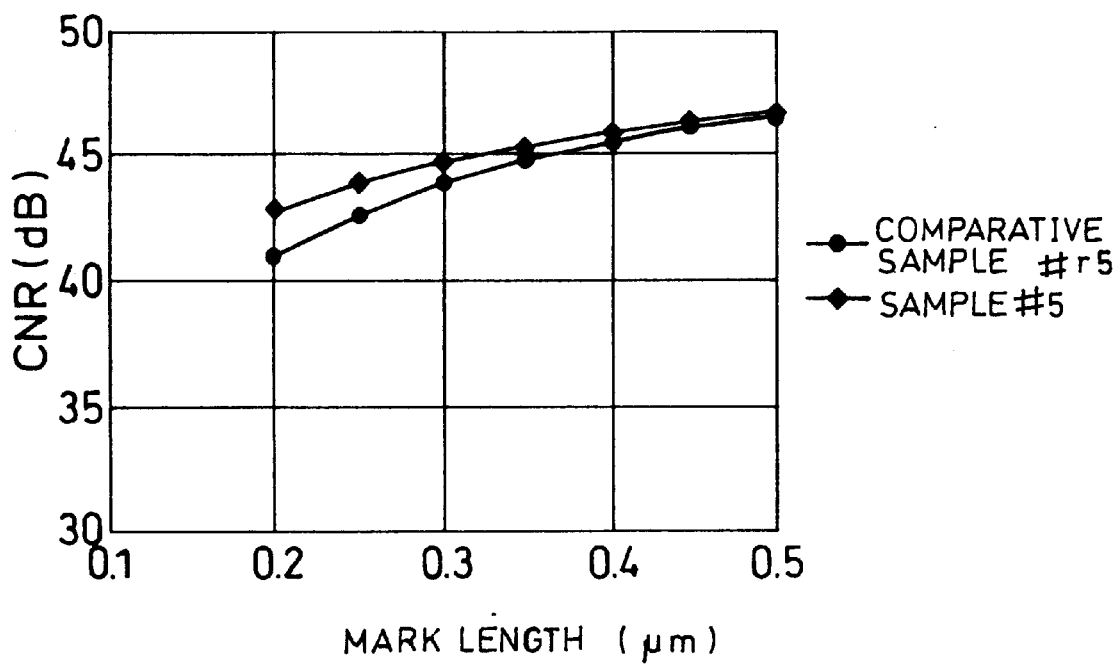
FIG. 23 is a graph showing the mark length dependency of the signal-to-noise ratio of the magneto-optical disk shown in FIG. 22.

FIG. 23 is a graph showing mark the length dependency of the CNR (signal-to-noise ratio) of sample #5, measured by continuously projecting a playback laser of 3.3 mW. For comparison, FIG. 23 also shows, as a graph, the mark length dependency of the CNR of a magneto-optical disk (denoted as comparative sample #r5) having the same arrangement as sample #5 except that no magnetic flux adjusting layer 16 is provided.

Comparative sample #r5 differs from sample #2 mentioned earlier in the second embodiment (see FIG. 8 and FIG. 9) only slightly in magnetic properties of the storage layers. Consequently, comparative sample #r5 exhibits substantially the same level in CNR as sample #2; it is thus verified that the magnetic domain expansion reproduction is achieved with comparative sample #r5 similarly to sample #2. It should be noted that for measurement on comparative sample #r5, laser power was set to 7.0 mW during recording and to 3.0 mW during reproduction.

As shown in FIG. 23, the CNR of sample #5 is higher than that of comparative sample #r5. Especially, at small mark lengths (ex. at 0.2 μm), sample #5 realizes more satisfactory magnetic domain expansion reproduction than comparative sample #r5.

Hence, sample #5 of the present embodiment, since it is provided with the magnetic flux adjusting layer 16, restrains the leakage magnetic flux arising from the storage layer 15 and thereby allows the magnetic information in the storage layer 15 to be duplicated to the supplementary reproduction layer 2 at high reproduction resolution at temperatures below the duplication temperature range, which realizes magnetic domain expansion reproduction where the strength of reproduced signals does not deteriorate even at small mark lengths.

As described above, the magneto-optical storage medium of the present embodiment includes, at least:

a reproduction layer 1 exhibiting an in-plane magnetization state at room temperature and changing to a perpendicular magnetization state at a transition temperature Tp1;

a supplementary reproduction layer 2 exhibiting an in-plane magnetization state at room temperature and changing to a perpendicular magnetization state at a transition temperature Tp2;

an in-plane magnetization layer 13 made of an in-plane magnetization film;

a storage layer 15 made of a perpendicular magnetization film; and a magnetic flux adjusting layer 16 made of a perpendicular magnetization film that exhibits a different magnetic polarity from the storage layer 15 and that has a Curie temperature Tc16 lower than the Curie temperature Tc15 of the storage layer 15, the layers being deposited in this order, the magneto-optical storage medium being arranged so as to satisfy:

$$Tp1 < Tp2,$$

and $$Tc13 \leq Tp2$$

where Tc13 is the Curie temperature of the in-plane magnetization layer 13.

This arrangement enables the magneto-optical storage medium to amplify the magnetic information stored in the storage layer 15 and duplicate it to the reproduction layer 1, and signals whose cycle is equal to, or below, diffraction limits of light to be reproduced from the storage layer 15 without reducing the amplitude. Further, the provision of the in-plane magnetization layer 13 enables the magneto-optical storage medium to achieve even higher reproduction resolution.

Further, as to the magneto-optical storage medium of the present embodiment, the magnetic properties of the reproduction layer 1, the supplementary reproduction layer 2, and the storage layer 15 are adjusted so that the magnetostatic coupling forces between the storage layer 15 and the supplementary reproduction layer 2 at the transition temperature Tp2 are stronger than the magnetostatic coupling forces between the storage layer 15 and the reproduction layer 1 at the transition temperature Tp1.

These adjustments optimize the magnetostatic coupling state between the storage layer 15 and the reproduction layer 1 and the magnetostatic coupling state between the storage layer 15 and the supplementary reproduction layer 2, enabling the magneto-optical storage medium to perform stable magnetic domain duplication and magnetic domain expansion reproduction.

[Embodiment 6]

Referring to FIG. 24 through FIG. 27, the following description will explain another embodiment in accordance with the present invention. Here, for convenience, members of the present embodiment that have the same arrangement and function as members of any of the first to fifth embodiments, and that are mentioned in any of those embodiments are indicated by the same reference numerals and description thereof is omitted.

Figure 25:
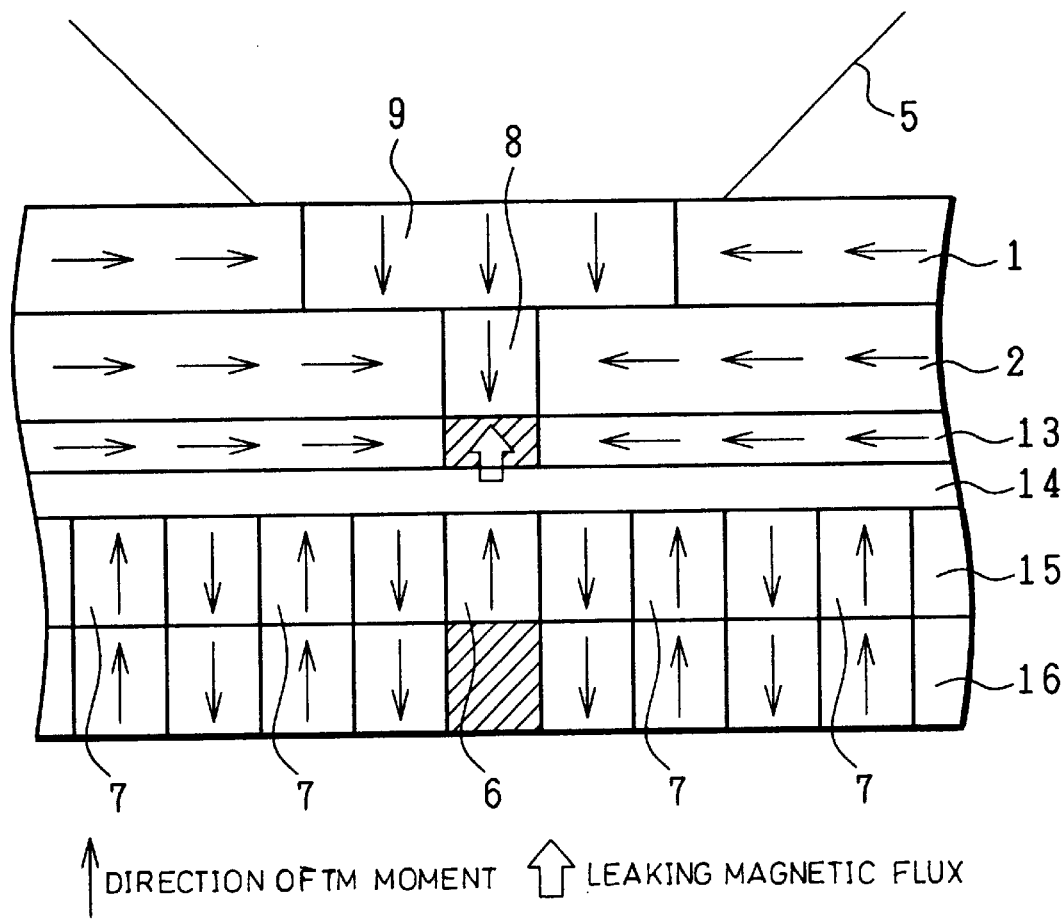
FIG. 25 is a schematic cross-sectional view showing a magnetization state of a magneto-optical storage medium of still a further embodiment in accordance with the present invention during reproduction.

As shown in FIG. 25, the magneto-optical storage medium of the present embodiment is arranged similarly to those of the fourth and fifth embodiments so as to include a storage layer 15 and a magnetic flux adjusting layer 16 that exhibit mutually different magnetic properties, in place of the storage layer 4 of the magneto-optical storage medium mentioned earlier in the third embodiment (see FIG. 11).

Figure 24:
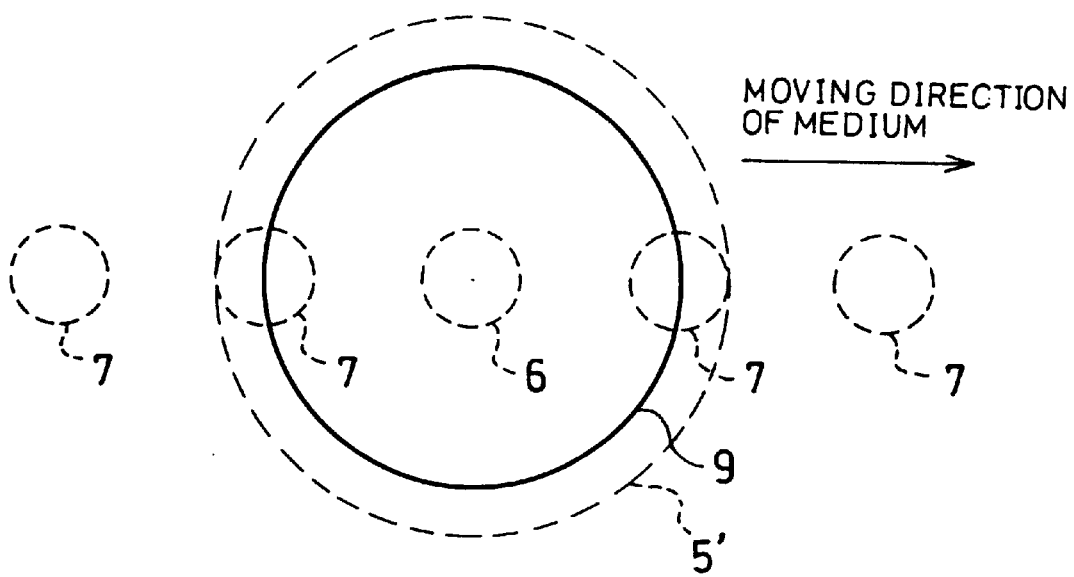
FIG. 24 is a schematic plan view showing a magnetization state of the magneto-optical storage medium shown in FIG. 25 during reproduction.

First of all, referring to FIG. 24 and FIG. 25, principals in reproduction of the magneto-optical storage medium of the present embodiment will be explained. FIG. 24 and FIG. 25 are plan and cross-sectional views, respectively, schematically illustrating a magnetization state of the magneto-optical storage medium during reproduction.

As shown in FIG. 25, the magneto-optical storage medium of the present embodiment is arranged from sequentially stacked layers including a reproduction layer 1, a supplementary reproduction layer 2, an in-plane magnetization layer 13, a non-magnetic intermediate layer 14, a storage layer 15, and a magnetic flux adjusting layer 16. It should be noted with regard to the arrows in FIG. 25 that the black ones denote the directions of the magnetization moments of transition metals (TMs), and the outlined one denotes the direction of a leakage magnetic flux.

It should be noted that in the present embodiment the storage layer 15 and the magnetic flux adjusting layer 16 only need to have mutually different magnetic polarities; there are no restrictions on the sequence in which the storage layer 15 and the magnetic flux adjusting layer 16 are stacked; they may be stacked in the reverse sequence from that shown in FIG. 25.

As shown in FIG. 24 and FIG. 25, in and below the duplication temperature range, the magneto-optical storage medium restrains the leakage magnetic flux arising from the storage layer 15 and the magnetic flux adjusting layer 16. Upon heating the magneto-optical storage medium using a light beam 5 (light beam spot 5'), the magnetic flux adjusting layer 16 loses magnetization, and a leakage magnetic flux arises only from the magnetic recording domain 6 that is heated up to the duplication temperature range. Here, a portion, of the in-plane magnetization layer 13, that corresponds to the magnetic recording domain 6 (slashed area on the top of the magnetic recording domain 6 in FIG. 25) is heated beyond the Curie temperature Tc13 (Tc), and loses magnetization. The resultant leakage magnetic flux duplicates the magnetic information in the storage layer 15 to the supplementary reproduction layer 2. The magnetic domain 8 formed in the supplementary reproduction layer 2 through the duplication is then expanded and form a duplicate magnetic domain 9 in the reproduction layer 1.

Hence, similarly to the magneto-optical storage mediums of the fourth and fifth embodiments (see FIG. 15 and FIG. 21), owing to the stacking of the storage layer 15 and the magnetic flux adjusting layer 16 that exhibit mutually different magnetic properties in place of the storage layer 4 mentioned earlier in the third embodiment (see FIG. 11), the magneto-optical storage medium of the present invention can duplicate magnetic domains from the storage layer 15 to the supplementary reproduction layer 2 at higher reproduction resolution. Therefore, with the magneto-optical storage medium, the magnetic domain expansion reproduction is performed in a stable manner and at higher reproduction resolution.

Next, a magneto-optical disk that is an application of the magneto-optical storage medium will be explained.

Figure 26:
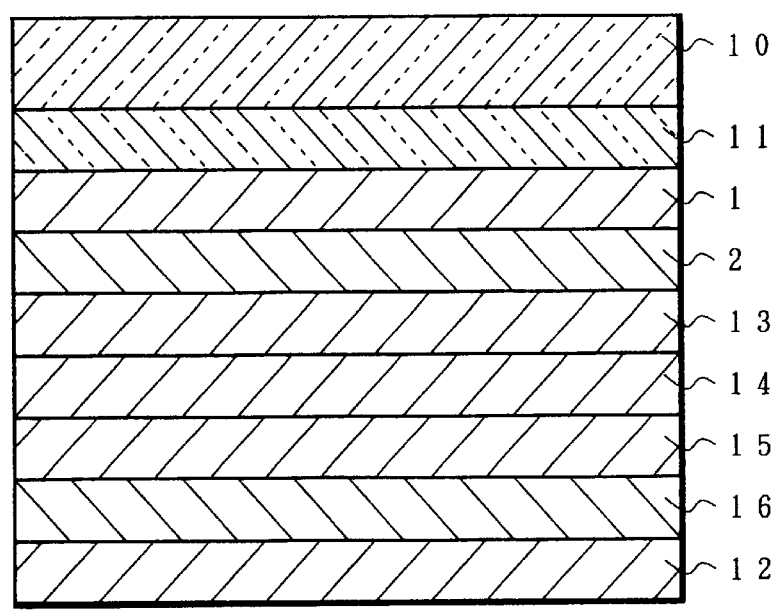
FIG. 26 is a schematic cross-sectional view showing the arrangement of a magneto-optical disk that is an application of the magneto-optical storage medium shown in FIG. 25.

As shown in FIG. 26, the magneto-optical disk includes a transparent dielectric protective layer 11, a reproduction layer 1, a supplementary reproduction layer 2, an in-plane magnetization layer 13, a non-magnetic intermediate layer 14, a storage layer 15, a magnetic flux adjusting layer 16, and a protective layer 12, all the layers being sequentially stacked on a substrate 10. It should be noted that the same materials as in the third embodiment can be used for the substrate 10, the transparent dielectric protective layer 11, the reproduction layer 1, the supplementary reproduction layer 2, the in-plane magnetization layer 13, and the non-magnetic intermediate layer 14, and the protective layer 12. Moreover, the same materials as in the fourth embodiment can be used for the storage layer 15 and the magnetic flux adjusting layer 16.

Further, thermal properties of the medium can be improved by additionally providing a thermodiffusive metal layer made of, for example, Al, AlTa, AlTi, AlCr, AlNi, AlCo, or Cu on the protective layer 12. A ultraviolet-ray-curing resin layer, a thermocuring resin layer, or a lubricant layer may be also provided on the protective layer 12 or on the thermodiffusive metal layer.

Incidentally, to allow recording using a weak magnetic field, a supplementary storage layer may be provided in direct contact with the storage layer 15 by deposition, the supplementary storage layer being made of a perpendicular magnetization film, containing, for example, GdFeCo, GdTbFeCo, or GdDyFeCo, that has smaller coercive forces than those of the storage layer 15 and a higher Curie temperature than that of the storage layer 15.

In the following description, a fabrication method of the magneto-optical disk incorporating the aforementioned arrangement, as well as its playback method, will be explained by way of specific examples.

(1) Fabrication Method of Magneto-Optical Disk

The following description will explain a fabrication method of the magneto-optical disk shown in FIG. 26.

First, a polycarbonate substrate 10 formed in a disk shape with guide grooves is placed in a sputtering device provided with an AlSi target, a first GdFeCo alloy target, a second GdFeCo alloy target, a GdFe alloy target, a TbFeCo alloy target, and a TbDyFeCo alloy target.

Secondly, an 80 nm thick, AlSiN, transparent dielectric protective layer 11 is formed on the substrate 10 in a similar manner to the magneto-optical disk mentioned earlier in the third embodiment (see FIG. 12). Subsequently, a 30 nm thick, $Gd_{0.29}(Fe_{0.88}Co_{0.12})_{0.71}$, reproduction layer 1 is formed on the transparent dielectric protective layer 11, followed by formation of a 30 nm thick, $Gd_{0.33}(Fe_{0.78}Co_{0.22})_{0.67}$, supplementary reproduction layer 2 on the reproduction layer 1. Subsequently, a 15 nm thick, $Gd_{0.13}Fe_{0.87}$, in-plane magnetization layer 13 is formed on the supplementary reproduction layer 2, followed by formation of a 1 nm thick, AlSi, non-magnetic intermediate layer 14 on the in-plane magnetization layer 13.

Thirdly, following a similar procedure as that for the magneto-optical disk mentioned earlier in the fourth embodiment (see FIG. 17), a 60 nm thick, $Tb_{0.22}(Fe_{0.84}Co_{0.16})_{0.78}$, storage layer 15 is formed on the non-magnetic intermediate layer 14; subsequently, a 40 nm thick, $(Tb_{0.6}Dy_{0.4})_{0.29}(Fe_{0.86}Co_{0.14})_{0.71}$, magnetic flux adjusting layer 16 is formed on the storage layer 15, followed by formation of a 20 nm thick, AlSiN, protective layer 12 on the magnetic flux adjusting layer 16.

(2) Playback Properties

The following description will explain playback properties of a magneto-optical disk (denoted as sample #6). Specifically, results from evaluation will be presented where the magneto-optical disk was recorded and played back through a magneto-optical pickup head using a semiconductor laser having a wavelength of 680 nm at a linear velocity of 2.5 m/s.

First of all, a recording laser of 7.1 mW was continuously projected while applying a recording magnetic field that was modulated at ±15 kA/m, so as to form a repetitive pattern of upward and downward magnetizations in the storage layer 15 and the magnetic flux adjusting layer 16 in accordance with the direction of the recording magnetic field. Then, by altering the modulation frequency of the recording magnetic field, a magnetic domain pattern was recorded with mark lengths varying from 0.2 to 0.5 μm. Here, the mark length is equal to the length of the magnetic recording domain and also equal to half the pitch between two adjacent magnetic recording domains.

Figure 27:
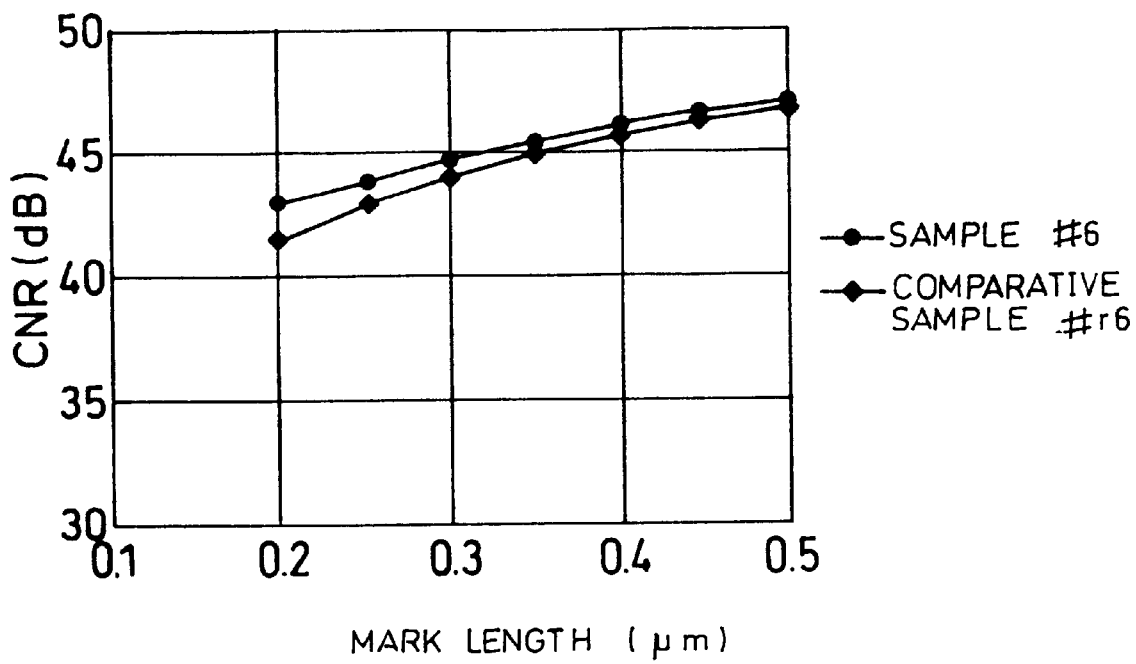
FIG. 27 is a graph showing the mark length dependency of the signal-to-noise ratio of the magneto-optical disk shown in FIG. 26.
Figure 28:
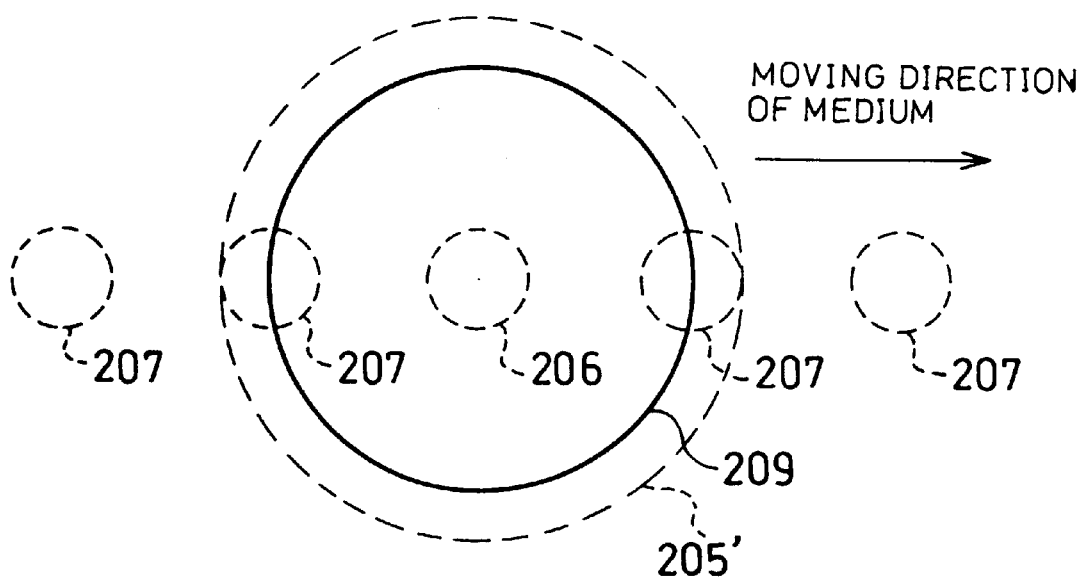
FIG. 28 is a schematic plan view showing a magnetization state of the conventional magneto-optical storage medium shown in FIG. 29 during reproduction.

FIG. 27 is a graph showing the mark length dependency of the CNR (signal-to-noise ratio) of sample #6, measured by continuously projecting a playback laser of 3.0 mW. For comparison, FIG. 27 also shows, as a graph, the mark length dependency of the CNR of a magneto-optical disk (denoted as comparative sample #r6) having the same arrangement as sample #6 except that magnetic flux adjusting layer 16 is provided.

Comparative sample #r6 differs from sample #3 mentioned earlier in the third embodiment (see FIG. 12 and FIG. 13) only slightly in magnetic properties of the storage layers. Consequently, comparative sample #r6 exhibits substantially the same level in CNR as sample #3; it is thus verified that the magnetic domain expansion reproduction is achieved with comparative sample #r6 similarly to sample #3. It should be noted that for measurement on comparative sample #r6, laser power was set to 6.8 mW during recording and to 2.8 mW during reproduction.

As shown in FIG. 27, the CNR of sample #6 is higher than that of comparative sample #r6. Especially, at small mark lengths (ex. at 0.2 μm), sample #6 realizes more satisfactory magnetic domain expansion reproduction than comparative sample #r6.

Hence, sample #6 of the present embodiment, since it is provided with the magnetic flux adjusting layer 16, restrains the leakage magnetic flux arising from the storage layer 15 and thereby allows the magnetic information in the storage layer 15 to be duplicated to the supplementary reproduction layer 2 at high reproduction resolution at temperatures below the duplication temperature range, which realizes magnetic domain expansion reproduction where the strength of reproduced signals does not deteriorate even at small mark lengths.

As described above, the magneto-optical storage medium of the present embodiment includes, at least:

a reproduction layer 1 exhibiting an in-plane magnetization state at room temperature and changing to a perpendicular magnetization state at a transition temperature Tp1;

a supplementary reproduction layer 2 exhibiting an in-plane magnetization state at room temperature and changing to a perpendicular magnetization state at a transition temperature Tp2;

an in-plane magnetization layer 13 made of an in-plane magnetization film;

a non-magnetic intermediate layer 14;

a storage layer 15 made of a perpendicular magnetization film; and a magnetic flux adjusting layer 16 made of a perpendicular magnetization film that exhibits a different magnetic polarity from the storage layer 15 and that has a Curie temperature Tc16 lower than the Curie temperature Tc15 of the storage layer 15, the layers being deposited in this order, the magneto-optical storage medium being arranged so as to satisfy:

$$Tp1<Tp2,$$

and $$Tc13 \leq Tp2$$

where Tc13 is the Curie temperature of the in-plane magnetization layer 13.

This arrangement enables the magneto-optical storage medium to amplify the magnetic information stored in the storage layer 15 and duplicate it to the reproduction layer 1, and signals whose cycle is equal to, or below, diffraction limits of light to be reproduced from the storage layer 15 without reducing the amplitude. Further, the provision of the in-plane magnetization layer 13 enables the magneto-optical storage medium to achieve even higher reproduction resolution. In addition, the non-magnetic intermediate layer 14, by breaking exchange coupling between the in-plane magnetization layer 13 and the storage layer 15, allows use of a thinner in-plane magnetization layer 13 and reduction in recording power and reproduction power.

Further, as to the magneto-optical storage medium of the present embodiment, the magnetic properties of the reproduction layer 1, the supplementary reproduction layer 2, and the storage layer 15 are adjusted so that the magnetostatic coupling forces between the storage layer 15 and the supplementary reproduction layer 2 at the transition temperature Tp2 are stronger than the magnetostatic coupling forces between the storage layer 15 and the reproduction layer 1 at the transition temperature Tp1.

These adjustments optimize the magnetostatic coupling state between the storage layer 15 and the reproduction layer 1 and the magnetostatic coupling state between the storage layer 15 and the supplementary reproduction layer 2, enabling the magneto-optical storage medium to perform stable magnetic domain duplication and magnetic domain expansion reproduction.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical storage medium, comprising:

a reproduction layer exhibiting an in-plane magnetization state at room temperature and changing to a perpendicular magnetization state at a transition temperature Tp1;

a supplementary reproduction layer exhibiting an in-plane magnetization state at room temperature and changing to a perpendicular magnetization state at a transition temperature Tp2;

a non-magnetic intermediate layer for breaking exchange coupling between a storage layer and the supplementary reproduction layer; and the storage layer made of a perpendicular magnetization film generating a leakage magnetic flux at temperatures around the transition temperature Tp2, said layers being deposited in this order, wherein Tp1<Tp2.

2. A magneto-optical storage medium, comprising:

a reproduction layer exhibiting an in-plane magnetization state at room temperature and changing to a perpendicular magnetization state at a transition temperature Tp1;

a supplementary reproduction layer exhibiting an in-plane magnetization state at room temperature and changing to a perpendicular magnetization state at a transition temperature Tp2;

an in-plane magnetization layer made of an in-plane magnetization film having a Curie temperature Tc; and a storage layer made of a perpendicular magnetization film generating a leakage magnetic flux at temperatures around the transition temperature Tp2, said layers being deposited in this order, wherein $Tp1 < Tp2$ $Tc \leq Tp2$.

3. The magneto-optical storage medium as set forth in claim 2, further comprising a non-magnetic intermediate layer, deposited between the in-plane magnetization layer and the storage layer, for breaking exchange coupling between the storage layer and the supplementary reproduction layer.

4. The magneto-optical storage medium as set forth in claim 1, further comprising a magnetic flux adjusting layer deposited adjacent to the storage layer, the magnetic flux adjusting layer being made of a perpendicular magnetization film having a different magnetic polarity from the storage layer and a Curie temperature lower than that of the storage layer.

5. The magneto-optical storage medium as set forth in claim 2, further comprising a magnetic flux adjusting layer deposited adjacent to the storage layer, the magnetic flux adjusting layer being made of a perpendicular magnetization film having a different magnetic polarity from the storage layer and a Curie temperature lower than that of the storage layer.

6. The magneto-optical storage medium as set forth in claim 3, further comprising a magnetic flux adjusting layer deposited adjacent to the storage layer, the magnetic flux adjusting layer being made of a perpendicular magnetization film having a different magnetic polarity from the storage layer and a Curie temperature lower than that of the storage layer.

7. The magneto-optical storage medium as set forth in claim 1, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

8. The magneto-optical storage medium as set forth in claim 2, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

9. The magneto-optical storage medium as set forth in claim 3, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

10. The magneto-optical storage medium as set forth in claim 4, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

11. The magneto-optical storage medium as set forth in claim 5, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

12. The magneto-optical storage medium as set forth in claim 6, wherein the reproduction layer, the supplementary reproduction layer, and the storage layer exhibit magnetic properties that are adjusted so that magnetostatic coupling forces between the storage layer and the supplementary reproduction layer at the transition temperature Tp2 are stronger than magnetostatic coupling forces between the storage layer and the reproduction layer at the transition temperature Tp1.

13. The magneto-optical storage medium as set forth in claim 1, wherein the transition temperature Tp1 of the reproduction layer is specified not less than 60° C. and not more than 180° C.

14. The magneto-optical storage medium as set forth in claim 1, wherein the reproduction layer is specified so as to have a Curie temperature not less than 160° C. and not more than 300° C.

15. The magneto-optical storage medium as set forth in claim 1, wherein the transition temperature Tp2 of the supplementary reproduction layer is specified lower than a Curie temperature of the storage layer.

16. The magneto-optical storage medium as set forth in claim 1, wherein the transition temperature Tp2 of the supplementary reproduction layer is specified not less than 100° C. and not more than 230° C.

17. The magneto-optical storage medium as set forth in claim 1, wherein the supplementary reproduction layer is specified so as to have a Curie temperature not less than 230° C.

18. The magneto-optical storage medium as set forth in claim 1, wherein the storage layer is specified so as to have a compensation temperature not less than −70° C. and not more than 60° C.

19. The magneto-optical storage medium as set forth in claim 1, wherein the storage layer has a Curie temperature not less than 180° C. and not more than 300° C.

20. The magneto-optical storage medium as set forth in claim 2, wherein the Curie temperature Tc of the in-plane magnetization layer is specified so as to approximate the transition temperature Tp2 of the supplementary reproduction layer.

21. The magneto-optical storage medium as set forth in claim 4,
wherein the magnetic flux adjusting layer is specified to have a Curie temperature substantially equal to the transition temperature Tp2 of the supplementary reproduction layer.

* * * * *